US006243838B1

(12) United States Patent
Liu et al.

(10) Patent No.: US 6,243,838 B1
(45) Date of Patent: Jun. 5, 2001

(54) METHOD FOR AUTOMATICALLY REPORTING A SYSTEM FAILURE IN A SERVER

(75) Inventors: Ji-hwan Liu, Cupertino; Ken Nguyen, San Jose; Karl Johnson, Palo Alto, all of CA (US)

(73) Assignee: Micron Electronics, Inc., Nampa, ID (US)

( * ) Notice: Subject to any disclaimer, the term of this patent is extended or adjusted under 35 U.S.C. 154(b) by 0 days.

(21) Appl. No.: 08/942,168

(22) Filed: Oct. 1, 1997

Related U.S. Application Data
(60) Provisional application No. 60/046,397, filed on May 13, 1997, provisional application No. 60/047,016, filed on May 13, 1997, and provisional application No. 60/046,416, filed on May 13, 1997.

(51) Int. Cl.[7] .................................................... G06F 11/34
(52) U.S. Cl. .............................................. 714/57; 714/43
(58) Field of Search .............................. 714/57, 48, 723, 714/43; 709/224

(56) References Cited

U.S. PATENT DOCUMENTS

| 4,057,847 | 11/1977 | Lowell et al. ........................ 364/200 |
| 4,100,597 | 7/1978 | Fleming et al. ..................... 364/474 |
| 4,449,182 | 5/1984 | Rubinson et al. . | |
| 4,672,535 | 6/1987 | Katzman et al. ..................... 364/200 |
| 4,692,918 | 9/1987 | Elliott et al. ............................ 370/85 |
| 4,695,946 | 9/1987 | Andreasen et al. .................. 364/200 |
| 4,707,803 | 11/1987 | Anthony, Jr. et al. ............... 364/900 |
| 4,769,764 | 9/1988 | Levanon ................................ 364/708 |
| 4,774,502 | 9/1988 | Kimura ................................. 340/501 |
| 4,821,180 | 4/1989 | Gerety et al. ........................ 364/200 |
| 4,835,737 | 5/1989 | Herrig et al. . | |
| 4,894,792 | 1/1990 | Mitchell et al. ..................... 364/708 |
| 4,949,245 | 8/1990 | Martin et al. . | |
| 4,968,977 | 11/1990 | Chinnaswamy et al. ......... 340/825.8 |
| 4,999,787 | 3/1991 | McNally et al. . | |

(List continued on next page.)

FOREIGN PATENT DOCUMENTS

| 0 866 403 A1 | 9/1998 | (EP) | ................................ G06F/13/10 |
| 04 333 118 | 11/1992 | (JP) | .................................. G06F/1/18 |
| 05 233 110 | 9/1993 | (JP) | .................................. G06F/3/00 |
| 07 093 064 | 4/1995 | (JP) | .................................. G06F/1/26 |
| 07 261 874 | 10/1995 | (JP) | .................................. G06F/1/18 |

OTHER PUBLICATIONS ftp.cdrom.com/pub/os2/diskutil/, PHDX software, phdx.zip download, Mar. 1995, "Parallel Hard Disk Xfer."
Cmasters, Usenet post to microsoft.public.windowsnt.setup, Aug. 1997, "Re: FDISK switches."
Hildebrand, N., Usenet post to comp.msdos.programmer, May 1995, "Re: Structure of disk partition into."
Lewis, L., Usenet post to alt.msdos.batch, Apr. 1997, "Re: Need help with automating FDISK and FORMAT."
Netframe, http://www.netframe-support.com/technology/datasheets/data.htm, before Mar. 1997, "Netframe Cluster-System 9008 Data Sheet."
Simos, M., Usenet post to comp.os.msdos.misc, Apr. 1997, "Re: Auto FDISK and FORMAT."

(List continued on next page.)

*Primary Examiner*—Robert Beausoleil
*Assistant Examiner*—Scott Baderman
(74) *Attorney, Agent, or Firm*—Knobbe, Martens, Olson & Bear, LLP

(57) ABSTRACT

A method of reporting a system failure in a server system, which includes the following acts: detecting a system failure condition; transmitting failure information related to the failure condition to a system recorder; storing the failure information into a system log; sending an event signal to a system interface; and reporting an occurrence of an event to a central processing unit of the server system.

42 Claims, 14 Drawing Sheets

U.S. PATENT DOCUMENTS

| | | | |
|---|---|---|---|
| 5,007,431 | 4/1991 | Donehoo, III | 128/696 |
| 5,033,048 | 7/1991 | Pierce et al. | 371/21.2 |
| 5,051,720 | 9/1991 | Kittirutsunetorn | 340/310 R |
| 5,073,932 | 12/1991 | Yossifor et al. | 380/23 |
| 5,103,391 | 4/1992 | Barrett | 364/133 |
| 5,118,970 | 6/1992 | Olson et al. | 307/443 |
| 5,121,500 | 6/1992 | Arlington et al. | 395/750 |
| 5,136,708 | 8/1992 | Lapourtre et al. | 395/650 |
| 5,136,715 | 8/1992 | Hirose et al. | 395/775 |
| 5,138,619 | 8/1992 | Fasang et al. | 371/21.1 |
| 5,157,663 | 10/1992 | Major et al. | 371/9.1 |
| 5,210,855 | 5/1993 | Bartol . | |
| 5,222,897 | 6/1993 | Collins et al. | 439/157 |
| 5,245,615 | 9/1993 | Treu | 371/16.5 |
| 5,247,683 | 9/1993 | Holmes et al. | 395/700 |
| 5,253,348 | 10/1993 | Scalise | 395/325 |
| 5,265,098 | 11/1993 | Mattson et al. | 371/11.1 |
| 5,266,838 | 11/1993 | Gerner | 307/19 |
| 5,269,011 | 12/1993 | Yanai et al. . | |
| 5,272,382 | 12/1993 | Heald et al. | 307/66 |
| 5,272,584 | 12/1993 | Austruy et al. . | |
| 5,276,814 | 1/1994 | Bourke et al. | 395/275 |
| 5,276,863 | 1/1994 | Heider | 395/575 |
| 5,277,615 | 1/1994 | Hastings et al. | 439/377 |
| 5,280,621 | 1/1994 | Barnes et al. | 395/800 |
| 5,283,905 | 2/1994 | Saadeh et al. | 395/750 |
| 5,311,397 | 5/1994 | Harshberger et al. | 361/683 |
| 5,311,451 | 5/1994 | Barrett | 364/550 |
| 5,317,693 | 5/1994 | Cuenod et al. . | |
| 5,329,625 | 7/1994 | Kannan et al. . | |
| 5,337,413 | 8/1994 | Lui et al. . | |
| 5,367,670 | 11/1994 | Ward et al. | 395/575 |
| 5,379,184 | 1/1995 | Barraza et al. | 361/685 |
| 5,386,567 | 1/1995 | Lien et al. . | |
| 5,388,267 | 2/1995 | Chan et al. | 395/700 |
| 5,402,431 | 3/1995 | Saadeh et al. | 371/67.1 |
| 5,423,025 | 6/1995 | Goldman et al. | 395/575 |
| 5,426,740 | 6/1995 | Bennett | 395/325 |
| 5,430,717 | 7/1995 | Fowler et al. | 370/58.2 |
| 5,430,845 | 7/1995 | Rimmer et al. | 395/275 |
| 5,432,715 | 7/1995 | Shigematsu et al. | 364/551.01 |
| 5,432,946 | 7/1995 | Allard et al. | 395/750 |
| 5,438,678 | 8/1995 | Smith | 395/750 |
| 5,448,723 | 9/1995 | Rowett | 395/200.02 |
| 5,455,933 | 10/1995 | Schieve et al. | 395/183.03 |
| 5,460,441 | 10/1995 | Hastings et al. | 312/298 |
| 5,463,766 | 10/1995 | Schieve et al. | 395/650 |
| 5,471,617 | 11/1995 | Farrand et al. . | |
| 5,471,634 | 11/1995 | Giorgio et al. | 395/600 |
| 5,473,499 | 12/1995 | Weir | 361/58 |
| 5,483,419 | 1/1996 | Kaczeus, Sr. et al. . | |
| 5,485,550 | 1/1996 | Dalton | 395/51 |
| 5,493,574 | 2/1996 | McKinley . | |
| 5,493,666 | 2/1996 | Fitch . | |
| 5,513,314 | 4/1996 | Kandasamy et al. | 395/182.04 |
| 5,513,339 | 4/1996 | Agrawal et al. | 395/500 |
| 5,515,515 | 5/1996 | Kennedy et al. | 395/283 |
| 5,517,646 | 5/1996 | Piccirillo et al. . | |
| 5,519,851 | 5/1996 | Bender et al. | 395/500 |
| 5,526,289 | 6/1996 | Dinh et al. | 364/557 |
| 5,528,409 | 6/1996 | Cucci et al. | 359/171 |
| 5,530,810 | 6/1996 | Bowman | 395/283 |
| 5,533,193 | 7/1996 | Roscoe | 395/183.15 |
| 5,535,326 | 7/1996 | Baskey et al. | 395/182.02 |
| 5,542,055 | 7/1996 | Amini et al. | 395/281 |
| 5,546,272 | 8/1996 | Moss et al. | 361/687 |
| 5,548,712 | 8/1996 | Larson et al. | 395/182.05 |
| 5,555,510 | 9/1996 | Verseput et al. . | |
| 5,559,764 | 9/1996 | Chen et al. | 396/30 |
| 5,559,958 | 9/1996 | Farrand et al. | 395/183.03 |
| 5,560,022 | 9/1996 | Dunstan et al. | 395/750 |
| 5,564,024 | 10/1996 | Pemberton | 395/283 |
| 5,566,299 | 10/1996 | Billings et al. | 395/182.02 |
| 5,566,339 | 10/1996 | Perholtz et al. | 395/750 |
| 5,568,610 | 10/1996 | Brown . | |
| 5,572,403 | 11/1996 | Mills | 361/695 |
| 5,579,487 | 11/1996 | Meyerson et al. | 395/280 |
| 5,579,491 | 11/1996 | Jeffries et al. . | |
| 5,579,528 | 11/1996 | Register | 395/671 |
| 5,581,712 | 12/1996 | Herrman . | |
| 5,584,030 | 12/1996 | Husak et al. | 395/750 |
| 5,586,250 | 12/1996 | Carbonneau et al. | 395/183.2 |
| 5,588,121 | 12/1996 | Reddin et al. | 395/200.15 |
| 5,588,144 | 12/1996 | Inoue et al. . | |
| 5,592,611 | 1/1997 | Midgely et al. | 395/182.02 |
| 5,596,711 | 1/1997 | Burckhartt et al. | 395/182.21 |
| 5,598,407 | 1/1997 | Bud et al. | 370/330 |
| 5,602,758 | 2/1997 | Lincoln et al. | 364/505 |
| 5,606,672 | 2/1997 | Wade . | |
| 5,608,876 | 3/1997 | Cohen et al. . | |
| 5,615,207 | 3/1997 | Gephardt et al. . | |
| 5,621,159 | 4/1997 | Brown et al. | 73/9 |
| 5,621,892 | 4/1997 | Cook . | |
| 5,622,221 | 4/1997 | Genga, Jr. et al. | 165/208 |
| 5,625,238 | 4/1997 | Ady et al. | 307/147 |
| 5,627,962 | 5/1997 | Goodrum et al. | 395/182.11 |
| 5,628,028 | 5/1997 | Michelson | 395/825 |
| 5,630,076 | 5/1997 | Saulpaugh et al. | 395/284 |
| 5,631,847 | 5/1997 | Kikinis | 364/514 R |
| 5,632,021 | 5/1997 | Jennings et al. . | |
| 5,636,341 | 6/1997 | Matsushita et al. | 395/182.11 |
| 5,638,289 | 6/1997 | Yamada et al. . | |
| 5,644,470 | 7/1997 | Benedict et al. . | |
| 5,644,731 | 7/1997 | Liencres et al. . | |
| 5,651,006 | 7/1997 | Fujino et al. . | |
| 5,652,832 | 7/1997 | Kane et al. . | |
| 5,652,839 | 7/1997 | Giorgio et al. | 395/200.11 |
| 5,652,892 | 7/1997 | Ugajin | 395/750 |
| 5,652,908 | 7/1997 | Douglas et al. | 395/800 |
| 5,655,083 | 8/1997 | Bagley | 395/182.31 |
| 5,664,118 | 9/1997 | Nishigaki et al. | 395/283 |
| 5,664,119 | 9/1997 | Jeffries et al. . | |
| 5,668,943 | 9/1997 | Attanasio et al. | 395/182.05 |
| 5,668,992 | 9/1997 | Hammer et al. | 395/651 |
| 5,669,009 | 9/1997 | Buktenica et al. | 395/800.35 |
| 5,671,371 | 9/1997 | Kondo et al. | 395/306 |
| 5,680,288 | 10/1997 | Carey et al. . | |
| 5,696,895 | 12/1997 | Hemphill et al. | 395/182.02 |
| 5,696,949 | 12/1997 | Young | 395/551 |
| 5,696,970 | 12/1997 | Sandage et al. . | |
| 5,701,417 | 12/1997 | Lewis et al. | 395/200.16 |
| 5,704,031 | 12/1997 | Mikami et al. | 395/182.02 |
| 5,708,775 | 1/1998 | Nakamura | 395/185.01 |
| 5,708,776 | 1/1998 | Kikinis | 395/185.08 |
| 5,712,754 | 1/1998 | Sides et al. | 361/58 |
| 5,715,456 | 2/1998 | Bennett et al. | 395/652 |
| 5,717,570 | 2/1998 | Kikinis | 361/685 |
| 5,721,935 | 2/1998 | DeSchepper et al. | 395/750 |
| 5,726,506 | 3/1998 | Wood . | |
| 5,727,207 | 3/1998 | Gates et al. | 395/651 |
| 5,732,266 | 3/1998 | Moore et al. | 395/651 |
| 5,737,708 | 4/1998 | Grob et al. | 455/557 |
| 5,740,378 | 4/1998 | Rehl et al. . | |
| 5,742,514 | 4/1998 | Bonola | 364/492 |
| 5,742,833 | 4/1998 | Dea et al. | 395/750.05 |
| 5,747,889 | 5/1998 | Raynham et al. . | |
| 5,748,426 | 5/1998 | Bedingfield et al. . | |
| 5,752,164 | 5/1998 | Jones | 455/33.1 |
| 5,754,396 | 5/1998 | Felcman et al. | 361/683 |
| 5,754,449 | 5/1998 | Hoshal et al. | 364/550 |
| 5,754,797 | 5/1998 | Takahashi . | |

| | | | |
|---|---|---|---|
| 5,758,165 | 5/1998 | Shuff | 395/712 |
| 5,758,352 | 5/1998 | Reynolds et al. | 707/200 |
| 5,761,033 | 6/1998 | Wilhelm . | |
| 5,761,045 | 6/1998 | Olson et al. . | |
| 5,761,085 | 6/1998 | Giorgio | 364/505 |
| 5,761,707 | 6/1998 | Aiken et al. | 711/118 |
| 5,764,924 | 6/1998 | Hong | 395/281 |
| 5,764,968 | 6/1998 | Ninomiya . | |
| 5,765,198 | 6/1998 | McCrocklin et al. . | |
| 5,767,844 | 6/1998 | Stoye | 345/212 |
| 5,768,496 * | 6/1998 | Lidgett et al. | 395/183.01 |
| 5,768,541 | 6/1998 | Pan-Ratzlaff . | |
| 5,768,542 | 6/1998 | Enstrom et al. . | |
| 5,771,343 | 6/1998 | Hafner et al. | 395/182.02 |
| 5,774,645 | 6/1998 | Beaujard et al. | 395/183.01 |
| 5,777,897 | 7/1998 | Giorgio | 364/557 |
| 5,778,197 | 7/1998 | Dunham | 395/284 |
| 5,781,716 | 7/1998 | Hemphill et al. | 395/185.02 |
| 5,781,744 | 7/1998 | Johnson et al. | 395/283 |
| 5,781,767 | 7/1998 | Inoue et al. . | |
| 5,781,798 | 7/1998 | Beatty et al. . | |
| 5,784,555 | 7/1998 | Stone | 395/200.5 |
| 5,784,576 | 7/1998 | Guthrie et al. . | |
| 5,787,019 | 7/1998 | Knight et al. | 364/550 |
| 5,787,459 | 7/1998 | Stallmo et al. | 711/112 |
| 5,787,491 | 7/1998 | Merkin et al. | 711/173 |
| 5,790,775 | 8/1998 | Marks et al. | 395/182.07 |
| 5,790,831 | 8/1998 | Lin et al. . | |
| 5,793,948 | 8/1998 | Asahi et al. | 395/184.01 |
| 5,793,987 | 8/1998 | Quackenbush et al. . | |
| 5,793,992 | 8/1998 | Steele et al. | 395/293 |
| 5,794,035 | 8/1998 | Golub et al. . | |
| 5,796,185 | 8/1998 | Takata et al. . | |
| 5,796,580 | 8/1998 | Komatsu et al. | 361/687 |
| 5,796,981 | 8/1998 | Abudayyeh et al. . | |
| 5,797,023 | 8/1998 | Berman et al. | 395/750.06 |
| 5,798,828 | 8/1998 | Thomas et al. . | |
| 5,799,036 | 8/1998 | Staples . | |
| 5,799,196 | 8/1998 | Flannery | 395/750.03 |
| 5,802,269 | 9/1998 | Poisner et al. . | |
| 5,802,298 | 9/1998 | Imai et al. | 395/200.47 |
| 5,802,305 | 9/1998 | McKaughan et al. | 395/200.57 |
| 5,802,324 | 9/1998 | Wunderlich et al. | 395/281 |
| 5,802,393 | 9/1998 | Begun et al. . | |
| 5,802,552 | 9/1998 | Fandrich et al. . | |
| 5,802,592 | 9/1998 | Chess et al. | 711/164 |
| 5,803,357 | 9/1998 | Lakin | 236/78 B |
| 5,805,804 | 9/1998 | Laursen et al. | 395/200.02 |
| 5,805,834 | 9/1998 | McKinley et al. . | |
| 5,809,224 | 9/1998 | Schultz et al. . | |
| 5,809,256 | 9/1998 | Najemy | 395/283 |
| 5,809,287 | 9/1998 | Stupek, Jr. et al. | 395/500 |
| 5,809,311 | 9/1998 | Jones | 395/750.01 |
| 5,809,555 | 9/1998 | Hobson | 711/172 |
| 5,812,748 | 9/1998 | Ohran et al. | 395/182.02 |
| 5,812,757 | 9/1998 | Okamoto et al. . | |
| 5,812,858 | 9/1998 | Nookala et al. . | |
| 5,815,117 | 9/1998 | Kolanek . | |
| 5,815,647 | 9/1998 | Buckland et al. | 395/182.01 |
| 5,815,652 | 9/1998 | Ote et al. | 395/183.07 |
| 5,821,596 | 10/1998 | Miu et al. | 257/419 |
| 5,822,547 | 10/1998 | Boesch et al. . | |
| 5,826,043 | 10/1998 | Smith et al. | 395/281 |
| 5,835,719 | 11/1998 | Gibson et al. | 395/200.51 |
| 5,838,932 | 11/1998 | Alzien | 395/308 |
| 5,838,935 | 11/1998 | Davis et al. | 395/309 |
| 5,841,964 | 11/1998 | Yamaguchi | 395/113.21 |
| 5,845,061 | 12/1998 | Miyamoto et al. | 395/182.02 |
| 5,845,095 | 12/1998 | Reed et al. | 395/283 |
| 5,850,546 | 12/1998 | Kim | 395/651 |
| 5,852,724 | 12/1998 | Glenn, II et al. | 395/200.69 |
| 5,857,102 | 1/1999 | McChesney et al. | 395/653 |
| 5,864,653 | 1/1999 | Tavallaei et al. | 315/181 |
| 5,864,713 | 1/1999 | Terry | 395/872 |
| 5,867,730 | 2/1999 | Leyda | 395/830 |
| 5,875,307 | 2/1999 | Ma et al. | 395/281 |
| 5,875,308 | 2/1999 | Egan et al. | 395/283 |
| 5,875,310 | 2/1999 | Buckland et al. | 395/306 |
| 5,878,237 | 3/1999 | Olarig | 395/308 |
| 5,878,238 | 3/1999 | Gan et al. | 395/308 |
| 5,881,311 | 3/1999 | Woods | 395/824 |
| 5,884,027 | 3/1999 | Garbus et al. | 395/200.8 |
| 5,884,049 | 3/1999 | Atkinson | 395/281 |
| 5,886,424 | 3/1999 | Kim | 307/64 |
| 5,889,965 | 3/1999 | Wallach et al. | 395/283 |
| 5,892,898 | 4/1999 | Fujii et al. | 395/185.1 |
| 5,892,928 | 4/1999 | Wallach et al. | 395/283 |
| 5,898,846 | 4/1999 | Kelly | 395/284 |
| 5,898,888 | 4/1999 | Guthrie et al. | 395/308 |
| 5,905,867 | 5/1999 | Giorgio | 395/200.54 |
| 5,907,672 | 5/1999 | Matze et al. | 395/182.06 |
| 5,909,568 | 6/1999 | Nason | 395/500 |
| 5,911,779 | 6/1999 | Stallmo et al. | 714/6 |
| 5,913,034 | 6/1999 | Malcolm | 395/200.53 |
| 5,918,057 | 6/1999 | Chou et al. | 395/733 |
| 5,922,060 | 7/1999 | Goodrum | 710/103 |
| 5,930,358 | 7/1999 | Rao | 380/4 |
| 5,935,262 | 8/1999 | Barrett et al. | 714/46 |
| 5,936,960 | 8/1999 | Stewart | 370/438 |
| 5,938,751 | 8/1999 | Tavellaei et al. | 710/103 |
| 5,941,996 | 8/1999 | Smith et al. | 714/47 |
| 5,964,855 | 10/1999 | Bass et al. | 710/103 |
| 5,983,349 | 11/1999 | Kodama et al. | 713/200 |
| 5,987,554 | 11/1999 | Liu et al. | 710/129 |
| 5,987,627 | 11/1999 | Rawlings, III | 714/48 |
| 6,012,130 | 1/2000 | Beyda et al. | 711/173 |
| 6,038,624 | 3/2000 | Chan et al. | 710/103 |

OTHER PUBLICATIONS

Wood, M. H., Usenet post to comp.os.netware.misc, Aug. 1996, "Re: Workstation duplication method for WIN95."

Lyons, Computer Reseller News, Issue 721, pp. 61–62, Feb. 3, 1997, "ACC Releases Low–Cost Solution for ISPs."

M2 Communications, M2 Presswire, 2 pages, Dec. 19, 1996, "Novell IntranetWare Supports Hot Pluggable PCI from NetFRAME."

Rigney, PC Magazine, 14(17): 375–379, Oct. 10, 1995, "The One for the Road (Mobile–aware capabilities in Windows 95)."

Shanley, and Anderson, PCI System Architecture, Third Edition, p. 382, Copyright 1995.

Gorlick, M., Conf. Proceedings: ACM/ONR Workshop on Parallel and Distributed Debugging, pp. 175–181, 1991, "The Flight Recorder: An Architectural Aid for System Monitoring."

IBM Technical Disclosure Bulletin, 92A+62947, pp. 391–394, Oct. 1992, Method for Card Hot Plug Detection and Control.

Sun Microsystems Computer Company, Part No. 802–5355–10, Rev. A, May 1996, "Solstice SyMON User's Guid."

Sun Microsystems, Part No. 802–6569–11, Release 1.0.1, Nov. 1996, "Remote Systems Diagnostics Installation & User Guide."

* cited by examiner

READ REQUEST FORMAT

| Offset | | |
|---|---|---|
| Byte 0 | Slave Addr (7 Bytes) | 0 LSBit |
| Byte 1 | MSBit (1) | Type |
| Byte 2 | Command ID (LSB) ||
| Byte 3 | Command ID (MSB) ||
| Byte 4 | Read Request Length (N) ||
| Byte 5 | Check Sum ||

*FIG. 3A*

WRITE REQUEST FORMAT

| Offset | | |
|---|---|---|
| Byte 0 | Slave Addr (7 Bytes) | 0 LSBit |
| Byte 1 | MSBit (0) | Type |
| Byte 2 | Command ID (LSB) ||
| Byte 3 | Command ID (MSB) ||
| Byte 4 | Write Request Length (N) ||
| Byte 5 | Data Byte 1 ||
| ⋮ | ⋮ ||
| Byte N+4 | Data Byte N ||
| Byte N+5 | Check Sum ||

*FIG. 3B*

READ RESPONSE FORMAT

| Offset | | |
|---|---|---|
| Byte 0 | Slave Addr (7 Bytes) | 1 LSBit |
| Byte 1 | Read Request Length (N) ||
| Byte 2 | Data Byte 1 ||
| ⋮ | ⋮ ||
| Byte N+1 | Data Byte N ||
| Byte N+2 | Status ||
| Byte N+3 | Check Sum ||
| Byte N+4 | Inverted Slave Addr ||

*FIG. 3C*

WRITE REQUEST FORMAT

| Offset | | |
|---|---|---|
| Byte 0 | Slave Addr (7 Bytes) | 1 LSBit |
| Byte 1 | Write Response Length (N) ||
| Byte 2 | Status ||
| Byte 3 | Check Sum ||
| Byte 4 | Inverted Slave Addr ||

*FIG. 3D*

REMOTE INTERFACE SERIAL PROTOCOL MESSAGE FORMATS

Request:

| SOM | Seq. # | TYPE | Data | ••• | Check | EOM |

*FIG. 5A*

Response

| SOM | Seq. # | STATUS | Data | ••• | Check | EOM |

*FIG. 5B*

Event Interrupt

| INT |

*FIG. 5C*

METHOD FOR AUTOMATICALLY REPORTING A SYSTEM FAILURE IN A SERVER

PRIORITY CLAIM

The benefit under 35 U.S.C. § 119(e) of the following U.S. provisional application(s) is hereby claimed:

| Title | Application No. | Filing Date |
|---|---|---|
| "Remote Access and Control of Environmental Management System" | 60/046,397 | May 13, 1997 |
| "Hardware and Software Architecture for Inter-Connecting an Environmental Management System with a Remote Interface" | 60/047,016 | May 13, 1997 |
| "Self Management Protocol for a Fly-By-Wire Service Processor" | 60/046,416 | May 13, 1997 |

RELATED APPLICATIONS

This application is related to U.S. application Ser. No.: 08/942,384, entitled, "System For Automatically Reporting A System Failure In A Server," which is being filed concurrently herewith.

APPENDICES

Appendix A, which forms a part of this disclosure, is a list of commonly owned copending U.S. patent applications. Each one of the applications listed in Appendix A is hereby incorporated herein in its entirety by reference thereto.

COPYRIGHT RIGHTS

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The invention relates to the reporting of problems and/or failure conditions in electronic systems. More particularly, the invention relates to a system and method for automatically reporting failure conditions in a server system.

2. Description of the Related Technology

In the computer industry, the fast and efficient detection of system errors and/or failures, and the subsequent correction of such failures, is critical to providing quality performance and product reliability to the users and buyers of computer systems. Particularly with respect to server computers which are accessed and utilized by many end users, early detection and notification of system problems and failures is an extremely desirable performance characteristic, especially for users who depend on the server to obtain data and information in their daily business operations, for example.

Typically, after a server has failed, users trying to access that server do not know that a problem exists or what the nature of the problem is. If a user experiences undue delay in connecting to the server or accessing a database through the server, the user typically does not know whether there is something wrong with the server, something wrong with his or her connection line, or whether both problems exist. In this scenario, the user must wait for a system operator, at the site where the server is located, to detect the error or failure and correct it. Hours can elapse before the failure is corrected. Often, a system operator or administrator will not discover the failure until users experience problems and start complaining. In the meantime, an important event may be missed and time is wasted, leading to user dissatisfaction with the server system.

Therefore, what is needed is a method and system for early detection of system failures or problems and prompt notification to a system operator or control center of the failure condition so that remedial actions may be quickly taken. In addition, for servers which may be remotely located from a control center, for example, a method and system for notifying the control center at a remote location is needed.

SUMMARY OF THE INVENTION

The invention addresses the above and other needs by providing a method and system for detecting a system failure and automatically reporting the failure to a system operator who may be located at or near the site where the server is present, or remotely located from the server such that the system operator communicates with the server via a modem connection. As used herein, the terms "failure", "system failure", "system failure condition" and any combination or conjugation of these terms refers to any problem, error, fault, or out of tolerance operating condition or parameter which may be detected in a computer and/or server system. Additionally, these terms may refer to a change in a status or condition of the server system, or a component or subsystem thereof.

In one embodiment of the invention, a method of reporting a system failure in a server system, includes: detecting a system failure condition; transmitting failure information related to the failure condition; storing the failure information; and reporting an occurrence of an event.

In another embodiment, in the method described above, the act of reporting the occurrence of the event includes: sending an event signal to a system interface, coupled to a central processing unit; setting a bit in a bit vector within the system interface, wherein the setting of the bit corresponds to a specified type of system failure; and setting a status of a status register within the system interface to indicate the occurrence of the event, wherein the central processing unit monitors the status register within the system interface at specified periodic intervals.

In another embodiment, a method of reporting a system failure in a server system, includes: detecting a system failure condition; transmitting failure information related to the failure condition to a system recorder; assigning a time value to the failure information; storing the failure information and its time value in a system log; reporting an occurrence of an event to a central processing unit coupled to the server system; and communicating failure information from the system log to an operator.

In a further embodiment, a method of reporting a system failure in a server system, includes: detecting a system failure condition; transmitting failure information related to the failure condition to a system recorder; assigning a time value to the failure information; storing the failure information and its time value in a system log; reporting an occurrence of an event to a local computer coupled to the server system via a remote interface; and communicating failure information from the system log to an operator.

In another embodiment, in the method described above, the act of reporting the occurrence of the event to the local computer includes: sending an event signal to the remote interface; setting a bit in a bit vector within the remote interface, wherein the setting of the bit corresponds to a specified type of system failure; and notifying the local computer that the event signal has been received by the remote interface.

In yet another embodiment, a method of reporting a system failure in a server system, includes: detecting a system failure condition; transmitting failure information related to the failure condition to a system recorder; assigning a time value to the failure information; storing the failure information and its time value in a system log; reporting an occurrence of an event to a remote computer coupled to the server system via a remote interface, wherein the remote computer is connected to the remote interface via a modem connection; and communicating failure information from the system log to an operator.

In a further embodiment, in the method described above, the act of reporting the occurrence of the event to the remote computer includes: sending an event signal to the remote interface; setting a bit in a bit vector within the remote interface, wherein the setting of the bit corresponds to a specified type of system failure; and notifying the remote computer that the event signal has been received by the remote interface.

In another embodiment, a method of reporting a system failure in a server system, includes: detecting a system failure condition; transmitting failure information related to the failure condition to a system recorder; storing the failure information in a system log; and executing a central processing unit operation in response to detecting a system failure condition.

BRIEF DESCRIPTION OF THE DRAWINGS

FIG. 3A is a table illustrating one embodiment of a data format for a read request signal communicated by the system interface and/or the remote interface of FIG. 1 in accordance with the invention.

FIG. 3B is a table illustrating one embodiment of a data format for a write request signal communicated by the system interface and/or the remote interface of FIG. 1 in accordance with the invention.

FIG. 3C is a table illustrating one embodiment of a data format for a read response signal communicated by the system interface and/or the remote interface of FIG. 1 in accordance with the invention.

FIG. 3D is a table illustrating one embodiment of a data format for a write response signal communicated by the system interface and/or the remote interface of FIG. 1 in accordance with the invention.

FIGS. 5A–5C illustrate one embodiment of a data format for a request, a response, and an interrupt signal, respectively, which are received and transmitted by the remote interface of FIG. 1.

DETAILED DESCRIPTION OF THE INVENTION

The invention is described in detail below with reference to the figures, wherein like elements are referenced with like numerals throughout.

Figure 1:
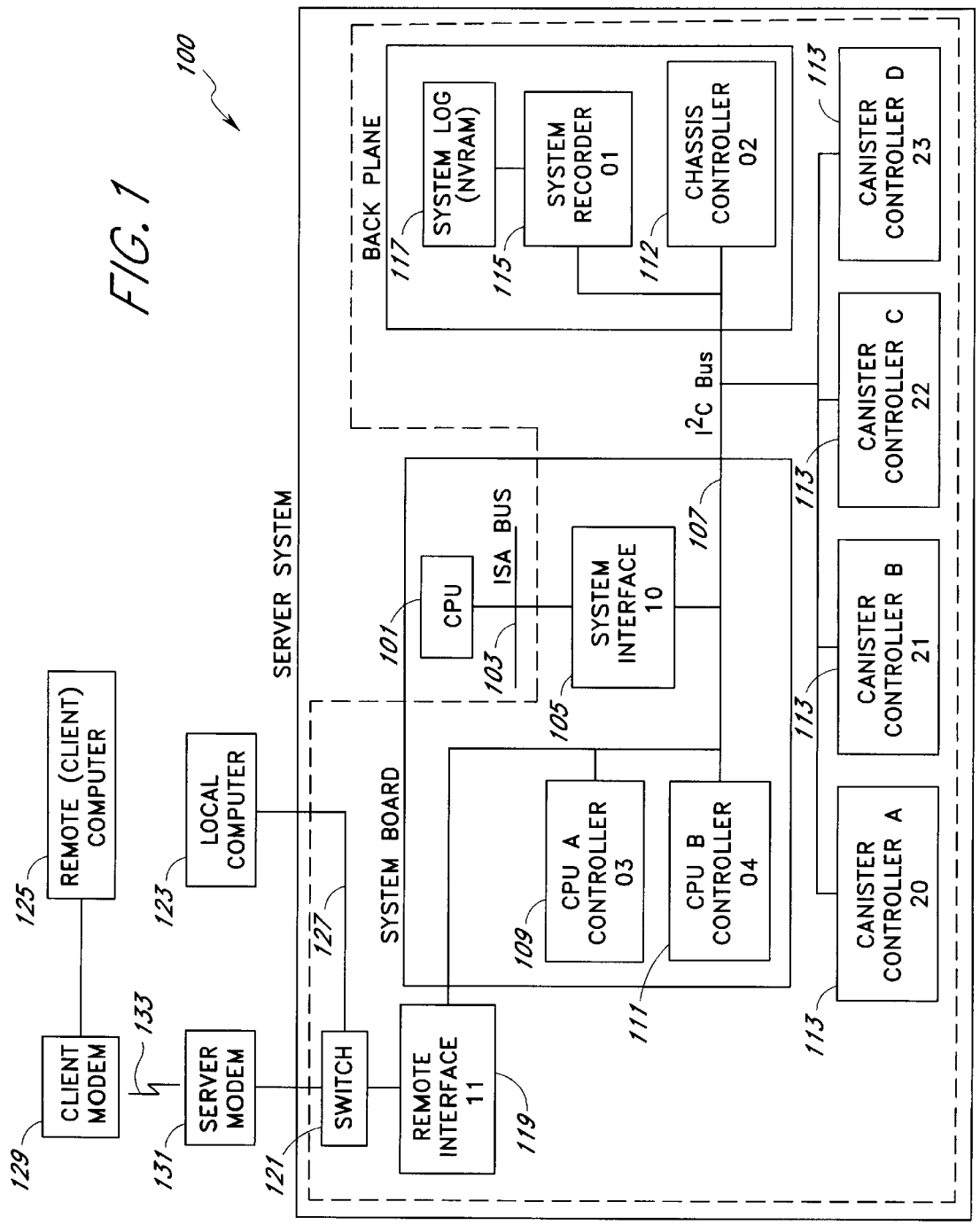
FIG. 1 is a block diagram of a server having a failure reporting system for detecting, recording and reporting a system failure in accordance with one embodiment of the invention.

Referring to FIG. 1, a block diagram of one embodiment of a server system 100 is illustrated. The server system 100 includes a central processing unit (CPU) 101 which executes the operating system (OS) software, which controls the communications protocol of the server system 100. The CPU 101 is coupled to an Industry Standard Architecture bus (ISA bus) 103 which transfers data to and from the CPU 101. The ISA bus 103 and its functionality are well-known in the art. Coupled to the ISA bus 103 is a system interface 105 which receives event signals from one or more microcontrollers that monitor and control various subsystems and components of the server system 100. As described in further detail below, an event signal sent to the system interface 105 indicates that a system failure or error has occurred. The various microcontrollers which monitor the server system 100 are also described in further detail below. As used herein, the term "event" may refer to the occurrence of any type of system failure. The structure and functionality of the system interface 105 is described in greater detail below with respect to FIG. 2. Additionally, as used herein the terms "signal," "command" and "data" and any conjugation and combinantions thereof, are used synonymously and interchangeably and refer to any information or value that may be transmitted, received or communicated between two electronic entities.

Coupled to the system interface 105 is a system bus 107. In one embodiment, the system bus 107 is an Inter-IC control bus ($I^2C$ bus), which transfers data to and from the various controllers and subsystems mentioned above. The $I^2C$ bus and the addressing protocol in which data is transferred across the bus are well-known in the art. One embodiment of a messaging protocol used in this $I^2C$ bus architecture is discussed in further detail below with reference to FIGS. 3A–3D. The command, diagnostic, monitoring, and logging functions of the failure reporting system of the invention are accessed through the common $I^2C$ bus protocol. In one embodiment, the $I^2C$ bus protocol uses addresses typically stored in a first byte of a data stream, as the means of identifying the various devices and commands to those devices. Any function can be queried by generating a "read" request, which has its address as part of its protocol format. Conversely, a function can be executed by "writing" to an address specified in the protocol format. Any controller or processor connected to the bus can initiate read and write requests by sending a message on the $I^2C$ bus to the processor responsible for that function.

Coupled to the system bus 107 is a CPU A controller 109, a CPU B controller 111, a chassis controller 112 and four canister controllers 113. These controllers monitor and control various operating parameters and/or conditions of the subsystems and components of the server system 100. For example, CPU A controller 109 may monitor the system fan speeds, CPU B controller 111 may monitor the operating temperature of the CPU 101, the chassis controller 112 may monitor the presence of various circuit boards and components of the server system, and each of the canister controllers 112 may monitor the presence and other operating conditions of "canisters" connected to the server system 100. A "canister" is a detachable module which provides expandability to the number of peripheral component interface (PCI) devices that may be integrated into the server system 100. In one embodiment, each canister is capable of providing I/O slots for up to four PCI cards, each capable of controlling and arbitrating access to a PCI device, such as a CD ROM disk drive, for example. A more detailed description of a canister can be found in a co-pending and commonly owned patent application entitled, "Network Server With Network Interface, Data Storage and Power Modules That May Be Removed and Replaced Without Powering Down the Network", which is listed in Appendix A attached hereto.

If one or more of the various controllers detects a failure, the respective controller sends an event signal to the system interface 105 which subsequently reports the occurrence of the event to the CPU 101. In one embodiment, the controllers 109, 111 and 113 are PIC16C65 microcontroller chips manufactured by Microchip Technologies, Inc. and the chassis controller 112 is a PIC16C74 microcontroller chip manufactured by Microchip Technologies, Inc.

Upon detecting a failure condition, a controller (109, 111, 112 or 113) not only transmits an event signal to the system interface 105, but also transmits failure information associated with the failure condition to a system recorder 115 connected to the system bus 107. The system recorder 115 then assigns a time stamp to the failure information and logs the failure by storing the failure information, along with its time stamp, into a system log 117. The operation and functionality of the system recorder 115 is described in further detail below with reference to FIG. 6. In one embodiment, the system log 117 is a non-volatile random access memory (NVRAM), which is well-known for its characteristics in maintaining the integrity of data stored within it, even when power to the memory cells is cut off for extended periods of time as a result of a system shut-down or power failure. The following are examples of various monitoring functions performed by some of the controllers described above. However, it is understood that the invention is not limited to these monitoring functions which serve only as examples.

In one embodiment, the controller 109 may be coupled to a system fan unit (not shown) and periodically monitor the speed of the fan. In one version, the fan unit transmits a pulse waveform to the controller 109, the frequency of which is proportional to the rate of rotation of the fan. The controller 109 checks the frequency of the pulse waveform on a periodic basis and determines whether the frequency is within a specified range of acceptable fan speeds. If a measured frequency is either too slow or too fast, the controller 109 detects a fan failure condition and sends an event signal to the system interface 105. The controller 109 also sends failure information to the system recorder 115 which assigns a time value to the failure information and stores the failure information with its time stamp into the system log 117. After the system interface 105 receives an event signal, it reports the occurrence of the event to the CPU 101.

As another example, the controller 111 may monitor a system temperature parameter. For example, a temperature sensor (not shown) may be coupled to the CPU 101 for monitoring its operating temperature. In one embodiment, the temperature sensor generates a voltage which is proportional to a measured operating temperature of the CPU 101. This voltage may then be converted by well-known means into a digital data signal and subsequently transmitted to the controller 109. The controller 111 then determines whether the measured temperature falls within specified limits. If the measured temperature is either too low or too high, a temperature failure condition is detected and an event signal is transmitted to the system interface 105 which subsequently reports the event to CPU 101 and an entry is written to the system log 117 by the system recorder 115.

In another embodiment, multiple temperature sensors (not shown) are coupled to a temperature bus (not shown). The temperature readings of all the sensors on the temperature bus are monitored every second and are read by Dallas Inc. temperature transducers (not shown) connected to the system bus 107. In one embodiment, the temperature transducers are model no. DS1621 digital thermometers, made by Dallas Semiconductor Corp. of Dallas, Tex. The temperature sensors are read in address order. The criteria for detecting a temperature fault is provided by two temperature limits: a shutdown limit, which is initialized to 70° C.; and lower and upper warning limits, which are set at −25° C. and 55° C., respectively. Each sensor is compared to the shutdown limit. If any temperature exceeds this limit, the system is powered off. If it is lower than the shutdown limit, each sensor is then compared to the warning limits. If any temperature is below −25° C. or above 55° C., a warning condition is created, a temperature LED is set, a temperature event signal is sent to the system interface 105, and an entry is written to the system log 117 by the system recorder 115.

The chassis controller 112 can monitor the presence of power supplies, for example. In one embodiment, power supplies may be detected and identified by a signal line coupling each power supply to a one-wire serial bus (not shown) which is in turn connected to a serial number chip (not shown) for identifying the serial number of each power supply. In one embodiment, the serial number chip is a DS2502 1 Kbit Add-only memory, manufactured by Dallas Semiconductor Corp. In order to detect the presence of a power supply, a trigger pulse may be sent by the chassis controller 112 to detect a power supply presence pulse. If there is a change in the presence of a power supply, a presence bit is updated and a power supply event is sent to the system interface 105. The power supply data is then written to the system log 117. If a power supply is removed from the system, no further action takes place. The length of the serial number string for that power supply address is set to zero. However, if a power supply is installed, its serial number is read by the Dallas Semiconductor Corp. one-wire protocol and written to the system log 117.

As shown in FIG. 1, the server system 100 further includes a remote interface 119 that is also connected to the system bus 107. The remote interface 119 also receives event signals from the various controllers 109, 111, 112 and/or 113 when a failure condition has been detected. The remote interface 119 is a link to the server system 100 for a remote client. In one embodiment, the remote interface 119 encapsulates messages in a transmission packet to provide error-free communications and link security. This method establishes a communication protocol in which data is transmitted to and from the remote interface 119 by using a serial communication protocol known as "byte stuffing." In this communication method, certain byte values in the data stream always have a particular meaning. For example, a certain byte value may indicate the start or end of a message, an interrupt signal, or any other command. A byte value may indicate the type or status of a message, or even be the message itself. However, the invention is not limited to any particular type of communication protocol and any protocol which is suitable may be used by the remote interface 119 in accordance with the invention. The remote interface 119 is described in further detail below with reference to FIG. 4.

Through the remote interface 119, a failure condition may be reported to a local system operator or to a remote operator. As used herein, the term "local" refers to a computer, system, operator or user that is not located in the same room as the hardware of the server system 100 but may be located nearby in a different room of the same building, for example. The term "remote" refers to a computer, system or operator that may be located in another city or state, for example, and is connected to the server system via a modem-to-modem connection. The remote operator is typically a client who is authorized to access data and information from the server system 100 through a remote computer 125.

Coupled to the remote interface 119 is a switch 121 for switching connectivity to the remote interface 119 between a local computer 123 and a remote computer 125. As shown in FIG. 1, the local computer 123 is connected to the remote interface 119 via a local communications line 127. The local communications line 127 may be any type of communication line, e.g., an RS232 line, suitable for transmitting data. The remote computer 125 is connected to the remote interface via a modem-to-modem connection established by a client modem 129 coupled to a server modem 131. The client modem 129 is connected to the server modem 131 by a telephone line 133.

The system interface 105, the system bus 107, the controllers 109, 111, 112 and 113, the system recorder 115, the system log 117, and the remote interface 119 are part of a network of controllers and processors which form the failure reporting system of the invention. One embodiment of this failure reporting system is known as the Intrapulse System™, designed and manufactured by Netframe, Inc., located at Milpitas, Calif. In FIG. 1, the Intrapulse System is that portion of the components surrounded by the dashed lines. The Intrapulse System monitors the status and operational parameters of the various subsystems of the server system 100 and provides system failure and error reports to a CPU 101 of the server system 100. Upon reporting the occurrence of an event to the CPU 101, the CPU 101 executes a software program which allows a system operator to access further information regarding the system failure condition and thereafter take appropriate steps to remedy the situation.

Figure 2:
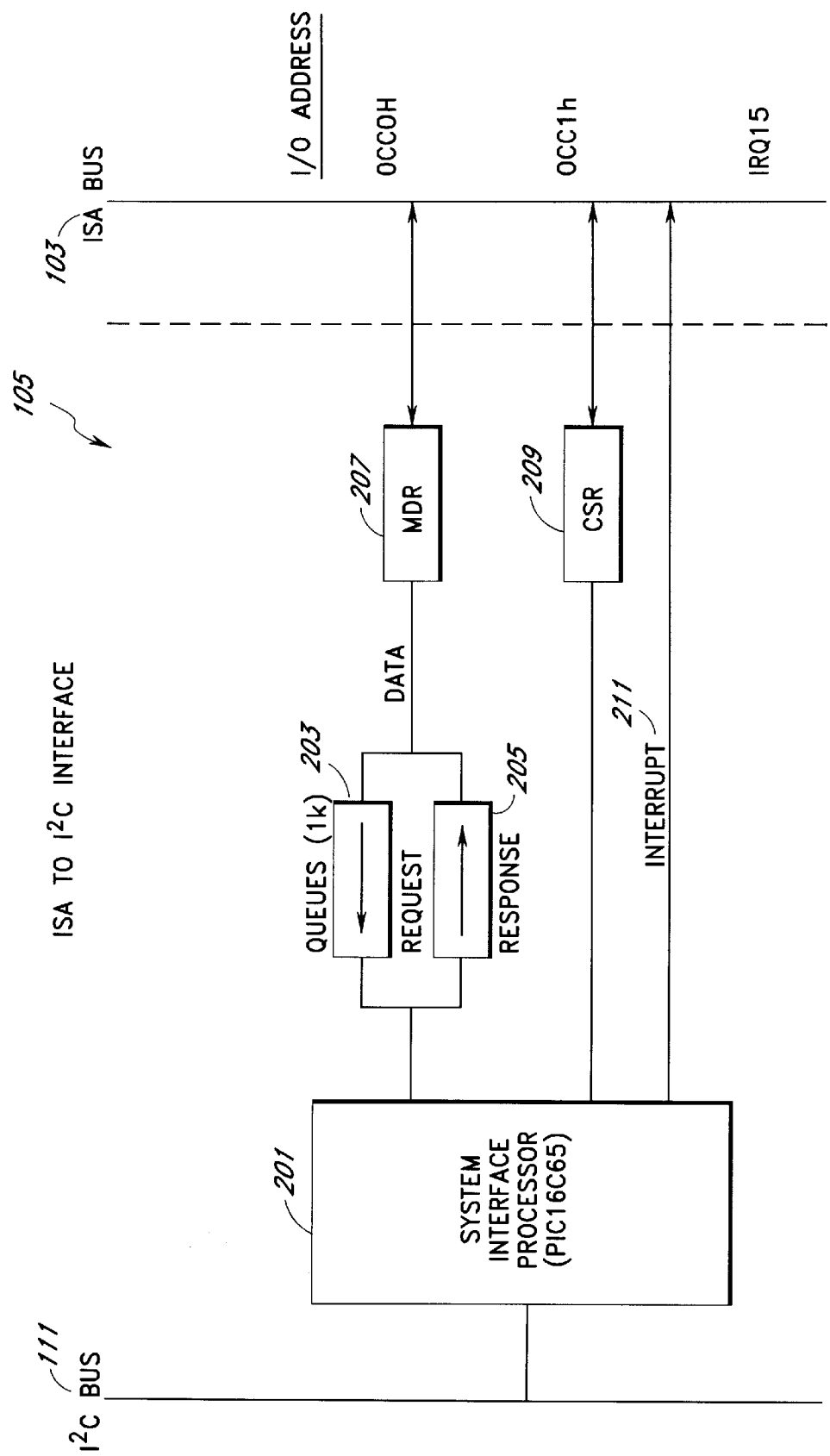
FIG. 2 is a system block diagram of one embodiment of a system interface which is used to transfer data between the server's operating and the server's failure reporting system, in accordance with the invention.

Referring to FIG. 2, a block diagram of one embodiment of the system interface 105 is shown surrounded by dashed lines. The system interface 105 is the interface used by the server system 100 to report failure events to the CPU 101. Furthermore, a system operator can access failure information related to a detected system failure by means of the system interface 105. A software program executed by the operating system of the CPU 101 allows the CPU 101 to communicate with the system interface 105 in order to retrieve information stored in the system log 117, as described above. In one embodiment, this software program is the Maestro Central program, manufactured by Netframe, Inc. The operating system of the CPU 101 may be an operating system (OS) driver program, such as Windows NT® or Netware® for Windows, for example.

The system interface 105 includes a system interface processor 201 which receives event and request signals, processes these signals, and transmits command, status and response signals to the operating system of the CPU 101. In one embodiment the system interface processor 201 is a PIC16C65 controller chip which includes an event memory (not shown) organized as a bit vector, having at least sixteen bits. Each bit in the bit vector represents a particular type of event. Writing an event to the system interface processor 201 sets a bit in the bit vector that represents the event. Upon receiving an event signal from the controller 109 (FIG. 1), for example, the system interface 105 reports the occurrence of an event to the CPU 101 by sending an interrupt to the CPU 101. Upon receiving the interrupt, the CPU 101 will check the status of the system interface 105 in order to ascertain that an event is pending. Alternatively, the reporting of the occurrence of an event may be implemented by programming the CPU 101 to periodically poll the status of the system interface 105 in order to ascertain whether an event is pending. The CPU 101 may then read the bit vector in the system interface processor 201 to ascertain the type of event that occurred and thereafter notify a system operator of the event by displaying an event message on a monitor coupled to the CPU 101. After the system operator has been notified of the event, as described above, he or she may then obtain further information about the system failure which generated the event signal by accessing the system log 117. This capability is also provided by the Maestro Central software program.

The system interface 105 communicates with the CPU 101 by receiving request signals from the CPU 101 and sending response signals back to the CPU 101. Furthermore, the system interface 105 can send and receive status and command signals to and from the CPU 101. For example, a request signal may be sent from a system operator enquiring as to whether the system interface 105 has received any event signals, or enquiring as to the status of a particular processor, subsystem, operating parameter, etc. A request signal buffer 203 is coupled to the system interface processor 201 and stores, or queues request signals in the order that they are received. Similarly, a response buffer 205 is coupled to the system interface processor 201 and queues outgoing response signals in the order that they are received.

A message data register (MDR) 207 is coupled to the request and response buffers 203 and 205. In one embodiment, the MDR 207 is eight bits wide and has a fixed address which may be accessed by the server's operating system via the ISA bus 103 coupled to the MDR 207. As shown in FIG. 2, the MDR 207 has an I/O address of 1CC1h. When a system operator desires to send a request signal to the system interface processor 201, he or she must first access the MDR 207 through the operating system of the server which knows the address of the MDR 207.

One embodiment of a data format for the request and response signals is illustrated in FIGS. 3A–3D. FIG. 3A shows a data format for a read request signal. FIG. 3B shows a similar data format for a write request signal. FIG. 3C shows a data format for a read response signal and FIG. 3D shows a data format for a write response signal.

The following is a summary of the data fields shown in FIGS. 3A–3D:

| FIELD | DESCRIPTION |
| --- | --- |
| Slave Addr | Specifies the processor identification code. This field is 7 bits wide. Bit [7...1]. |
| LSBit | Specifies what type of activity is taking place. If LSBit is clear (0), the master is transmitting to a slave. If LSBit is set (1), the master is receiving from a slave. |

-continued

| FIELD | DESCRIPTION |
|---|---|
| MSBit | Specifies the type of command. It is bit 7 of byte 1 of a request. If this bit is clear (0), this is a write command. If it is set (1), this is a read command. |
| Type | Specifies the data type of this command, such as bit or string. |
| Command ID (LSB) | Specifies the least significant byte of the address of the processor. |
| Command ID (MSB) | Specifies the most significant byte of the address of the processor. |
| Length (N) | |
|    Read Request | Specifies the length of the data that the master expects to get back from a read response. The length, which is in bytes, does not include the Status, Check Sum, and Inverted Slave Addr fields. |
|    Read Response | Specifies the length of the data immediately following this byte, that is byte 2 through byte N+1. The length, which is in bytes, does not include the Status, Check Sum, and Inverted Slave Addr fields. |
|    Write Request | Specifies the length of the data immediately following this byte, that is byte 2 through byte N+1. The length, which is in bytes, does not include the Status, Check Sum, and Inverted Slave Addr fields. |
|    Write Response | Always specified as 0. |
| Data Byte 1 .  .  . Data Byte N | Specifies the data in a read request and response, and a write request. |
| Status | Specifies whether or not this command executes successfully. A non-zero entry indicates a failure. |
| Check Sum | Specifies a direction control byte to ensure the integrity of a message on the wire. |
| Inverted Slave Addr | Specifies the Slave Addr, which is inverted. |

Referring again to FIG. 2, it is seen that the system interface 105 further includes a command and status register (CSR) 209 which controls operations and reports on the status of commands. The operation and functionality of CSR 209 is described in further detail below. Both synchronous and asynchronous I/O modes are provided by the system interface 105. Thus, an interrupt line 211 is coupled between the system interface processor 201 and the ISA bus 103 and provides the ability to request an interrupt when asynchronous I/O is complete, or when an event occurs while the interrupt is enabled. As shown in FIG. 2, in one embodiment, the address of the interrupt line 211 is fixed and indicated as IRQ 15 which is an interrupt address number used specifically for the ISA bus 103.

The MDR 207 and the request and response buffers 203 and 205, respectively, transfer messages between a system operator or client and the failure reporting system of the invention. The buffers 203 and 205 are configured as first-in first-out (FIFO) buffers. That is, in these buffers, the next message processed is the one that has been in the queue the longest time. The buffers 203 and 205 have two functions: (1) they match speeds between the high-speed ISA bus 103 and the slower system bus 117 (FIG. 1); and (2) they serve as interim buffers for the transfer of messages. This relieves the system interface processor 201 of having to provide this buffer.

When the MDR 207 is written to by the ISA bus 103, it loads a byte into the request buffer 203. When the MDR 207 is read from the ISA bus 203, it unloads a byte from the response buffer 205. The system interface processor 201 reads and executes the request from the request buffer 203 when a message command is received in the CSR 209. A response message is written to the response buffer 205 when the system interface processor 201 completes executing the command. The system operator or client can read and write message data to and from the buffers 203 and 205 by executing read and write instructions through the MDR 207.

The CSR 209 has two functions. The first is to issue commands, and the second is to report on the status of execution of a command. The commands in the system interface 105 are usually executed synchronously. That is, after issuing a command, the client must continue to poll the CSR status to confirm command completion. In addition to synchronous I/O mode, the client can also request an asynchronous I/O mode for each command by setting a "Asyn Req" bit in the command. In this mode, an interrupt is generated and sent to the ISA bus 103, via the interrupt line 211, after the command has completed executing.

The interrupt line 211 may use an ISA IRQ 15 protocol, as mentioned above, which is well-known in the art. Alternatively, the interrupt line 211 may utilize a level-triggered protocol. A level-triggered interrupt request is recognized by keeping the signal at the same level, or changing the level of a signal, to send an interrupt. In a system which utilizes the level-triggered interrupt, it is a particular level of a signal, either high or low, which represents the interrupt signal. In contrast, an edge-triggered interrupt, for example, is recognized by the signal level transition. That is an interrupt is detected when the signal changes from either a high level to a low level, or vice versa, regardless of the resulting signal level. A client can either enable or disable the level-triggered interrupt by sending "Enable Ints" and "Disable Ints" commands. If the interrupt line is enabled, the system interface processor sends an interrupt signal to the ISA bus 103, either when an asynchronous I/O is complete or when an event has been detected.

In the embodiment shown in FIG. 2, the system interface 105 may be a single-threaded interface. That is, only one client, or system operator, is allowed to access the system interface 105 at a time. Therefore, a program or application must allocate the system interface 105 for its use before using it, and then deallocate the interface 105 when its operation is complete. The CSR 209 indicates which client or operator is allocated access to the system interface 105 at a particular time.

A further discussion of the structure and operation of the system interface 105 may be found in a copending and commonly owned patent application entitled, "I$^2$C To ISA Bus Interface," which is listed in Appendix A attached hereto.

Figure 4:
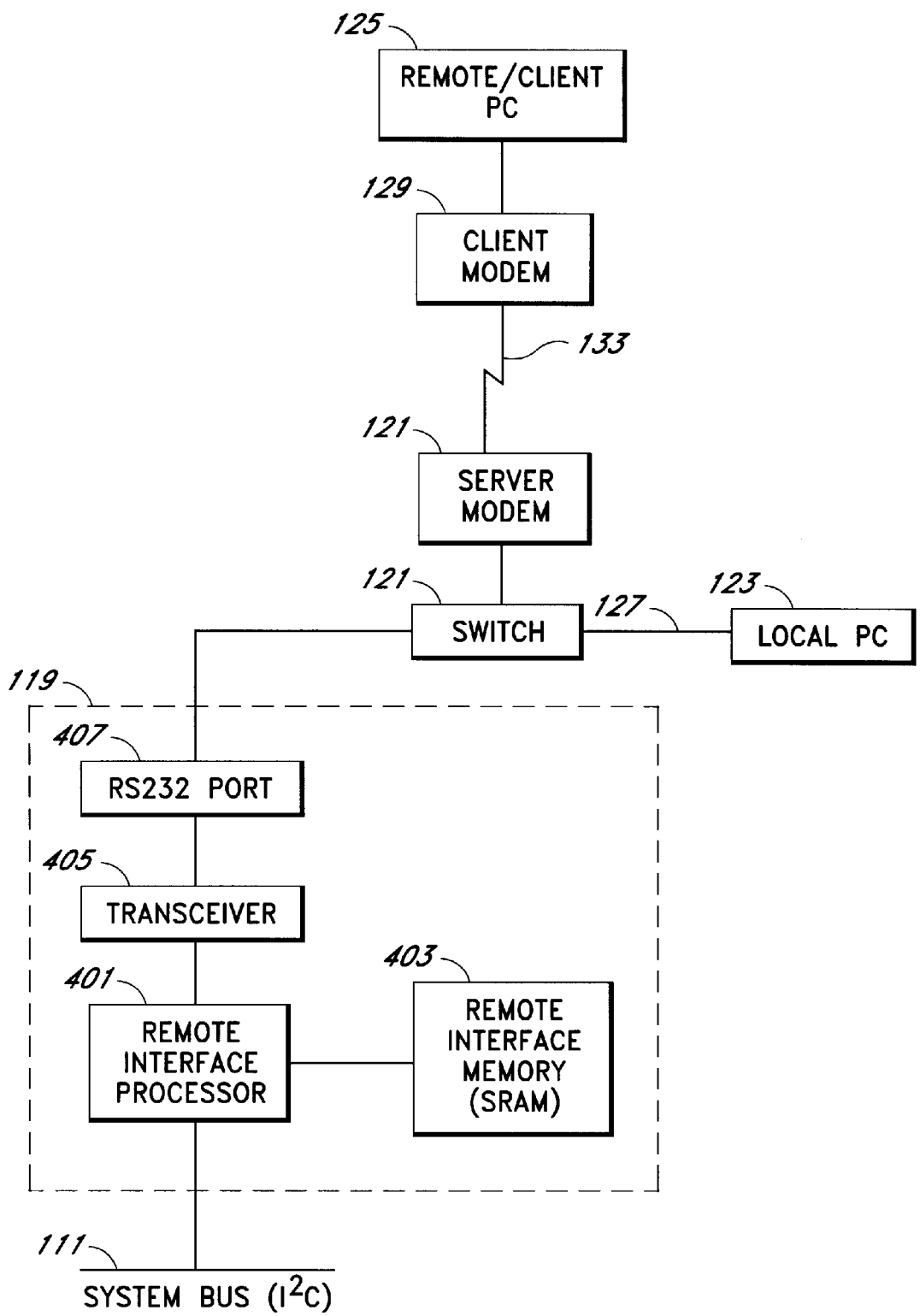
FIG. 4 is a system block diagram of one embodiment of the remote interface of FIG. 1.

FIG. 4 illustrates a system block diagram of one embodiment of the remote interface 119 of FIG. 1. As described above, the remote interface 119 serves as an interface which handles communications between the server system 100 (FIG. 1) and an external computer, such as a local computer 123 or a remote computer 125. The local computer 123 is typically connected to the remote interface 119, via a local communication line 127 such as an RS232 line, and the remote computer 129 is typically connected to the remote interface 119 by means of a modem connection line 133 which connects the remote modem 129 to the server modem 131.

As shown within the dashed lines of in FIG. 4, the remote interface 119 comprises a remote interface processor 401, a remote interface memory 403, a transceiver 405 and an RS232 port 407. The remote interface processor 401 is coupled to the system bus 107 and receives an event signal from the controller 109 (FIG. 1) when a failure condition has been detected. In one embodiment, the remote interface processor 401 is a PIC16C65 controller chip which includes an event memory (not shown) organized as a bit vector, having at least sixteen bits. Each bit in the bit vector represents a particular type of event. Writing an event to the remote interface processor 401 sets a bit in the bit vector that represents the event. The remote interface memory 403 is coupled to the remote interface processor 401 for receiving and storing event data, commands, and other types of data transmitted to the remote interface 119. In one embodiment, the remote interface memory 403 is a static random access memory (SRAM).

In order to communicate with external devices, the remote interface 119 further includes the transceiver 405, coupled to the remote interface processor 401, for receiving and transmitting data between the remote interface processor 401 and a local PC 123 or a remote/client PC 125, in accordance with a specified communication protocol. One embodiment of such a communication protocol is described in further detail below. In one embodiment, the transceiver 405 is an LT1133A signal processing chip. Coupled to the transceiver 405 is a RS232 communication port which is well-known in the art for providing data communications between computer systems in a computer network. One of the functions of the transceiver 405 is to transpose signal levels from the remote interface processor 401 to RS232 signal protocol levels.

The remote interface 119 is coupled to a switch 121 for switching access to the remote interface 119 between a local computer 123 and a remote PC 125. The switch 121 receives command signals from the remote interface processor 401 and establishes connectivity to the RS232 communication port 407 based on these command signals. Upon receiving an event signal, the remote interface processor 401 will set the connectivity of the switch 121 based on criteria such as the type of event that has been detected. If the switch 121 is set to provide communications between the local PC 123 and the remote interface 119, after receiving an event signal, the remote interface processor 401 transmits a Ready To Receive (RTR) signal to the local computer 123. A software program which is stored and running in the local computer 123 recognizes the RTR signal and sends back appropriate commands in order to interrogate the remote interface processor 401. In one embodiment, the software program which is stored and executed by the local computer 123 is the Maestro Recovery Manager software program, manufactured by Netframe, Inc. Upon interrogating the remote interface processor 401, the local computer 123 detects that an event signal has been received by the remote interface 119. The local computer 123 may then read the bit vector in the remote interface processor 401 to ascertain the type of event that occurred and thereafter notify a local user of the event by displaying an event message on a monitor coupled to the local computer 123. After the local user has been notified of the event, as described above, he or she may then obtain further information about the system failure which generated the event signal by accessing the system log 117 (FIG. 1) from the local computer 123 via the remote interface 119. This capability is also provided by the Maestro Recovery Manager software program.

If the switch 121 is set to provide connectivity to the remote/client computer 125 via a modem-to-modem connection, a server modem 131 will dial the modem number (telephone number) corresponding to the client modem 129 in order to establish a communication link with the remote computer 125. In one embodiment, the number of the client modem 129 is stored in the system log 117 (FIG. 1) and accessed by the remote interface processor 401 upon receiving specified event signals. When the client modem 129 receives "a call" from the server modem 131, the remote computer 125 will send back appropriate commands and/or data in order to interrogate the remote interface processor 401 in accordance with a software program running on the remote computer 125. In one embodiment, this software program is the Maestro Recovery Manager software program manufactured by Netframe, Inc. Upon interrogating the processor 401, the remote computer 125 will detect that an event signal has been transmitted to the remote interface 119. The remote computer 125 may then read the bit vector in the remote interface processor 401 to ascertain the type of event that occurred and thereafter notify a remote user of the event by displaying an event message on a monitor coupled to the remote computer 125. At this point, a remote user, typically a client authorized to have access to the server system 100, may obtain further information about the failure condition which generated the event signal by accessing the system log 117 (FIG. 1) from the remote computer 125 via the remote interface 119.

In one embodiment, the remote interface communication protocol is a serial protocol that communicates messages across a point-to-point serial link. This link is between the remote interface processor 401 and a local or remote client. The protocol encapsulates messages in a transmission packet to provide error-free communication and link security and further uses the concept of "byte stuffing" in which certain byte values in a data stream always have a particular meaning. Examples of bytes that have a special meaning in this protocol are:

SOM: Start of a message

EOM: End of a message

SUB: The next byte in the data stream must be substituted before processing.

INT: Event Interrupt

Data: An entire Message

The remote interface serial protocol uses two types of messages: (1) requests, which are sent by remote management systems (PCs) to the Remote Interface; and (2) responses, which are returned to the requester by the Remote Interface. The formats of these messages are illustrated in FIGS. 5A–5C.

The following is a summary of the fields within each of the messages shown in FIGS. 5A–5C:

| | |
|---|---|
| SOM | A special data byte value marking the start of a message. |
| EOM | A special data byte value marking the end of a message. |
| Seq.# | A one-byte sequence number, which is incremented on each request. It is stored in the response. |
| TYPE | One of the following types of requests: |
|     IDENTIFY | Requests the remote interface to send back identification information about the system to which it is connected. It also resets the next expected sequence number. Security authorization does not need to be established before the request is issued. |
|     SECURE | Establishes secure authorization on the serial link by checking password security data provided in the message with the server system password. |

-continued

| | | |
|---|---|---|
| UNSECURE | | Clears security authorization on the link and attempts to disconnect it. This requires security authorization to have been previously established. |
| MESSAGE | | Passes the data portions of the message to the remote interface for execution. The response from remote interface is sent back in the data portion of the response. This requires security authorization to have been previously established. |
| POLL | | Queries the status of the remote interface. This request is generally used to determine if an event is pending in the remote interface. |
| STATUS | | One of the following response status values: |
| | OK | Everything relating to communication with the remote interface is successful. |
| | OK_EVENT | Everything relating to communication with the remote interface is successful. In addition, there is one or more events pending in the remote interface. |
| | SEQUENCE | The sequence number of the request is neither the current sequence number or retransmission request, nor the next expected sequence number or new request. Sequence numbers may be reset by an IDENTIFY request. |
| | CHECK | The check byte in the request message is received incorrectly. |
| | FORMAT | Something about the format of the message is incorrect. Most likely, the type field contains an invalid value. |
| | SECURE | The message requires that security authorization be in effect. Or, if the message has a TYPE value of SECURE, the security check failed. |
| Check | | Indicates a message integrity check byte. Currently the value is 256 minus the previous bytes in the message. For example, adding all bytes in the message up, to and including the check byte should produce a result of zero (0). |
| INT | | A special one-byte message sent by the Remote Interface when it detects the transition from no events pending to one or more events pending. This message can be used to trigger reading events from the remote interface. Events should be read until the return status changes form OK_EVENT to OK. |

In one embodiment, the call-out protocol of the remote interface is controlled by a software code called Callout Script. The Callout script controls actions taken by the remote interface 119 when it is requested to make a callout to a local or remote computer, 123 or 125, respectively. The script is a compact representation of a simple scripting language that controls the interaction between a modem and a remote system. Because the script keyword fields are bytes, it requires a simple compiler to translate from text to the script. The script is stored in the system recorder 115 (FIG. 1) and is retrieved by the remote interface 119 when needed. The following is a summary of some of the fields of the callout script:

| Field | Data | Function |
|---|---|---|
| Label | Label Value | Establishes a label in the script. |
| Goto | Label Value | Transfers control to a label. |
| Speed | Speed Value | Sets the remote interface speed to the specified value. |
| Send | Data String | Sends the data string to the serial interface. |
| Test | Condition, label | Testes the specified condition and transfer to label if the tests is true. |
| Trap | Event, label | Establishes or removes a trap handler address for a given event. |

-continued

| Field | Data | Function |
|---|---|---|
| Search | Data string, label value | Searches for a specific data string of the receiving buffer. If the data string is found, remove the data up to and including this string, form the buffer, Then, transfer to label. |
| Control | Control | Takes the specified control action. |
| Wait | .1–25.5 sec. | Delays execution of the script for the specified time. |
| Exit | OK, Fail | Terminates script processing and exit with a status and log result. |

A further description of the remote interface 119 can be found in a copending and commonly owned U.S. patent application entitled, "System Architecture For Remote Access And Control of Environmental Management," which is listed in Appendix A attached hereto.

Figure 6:
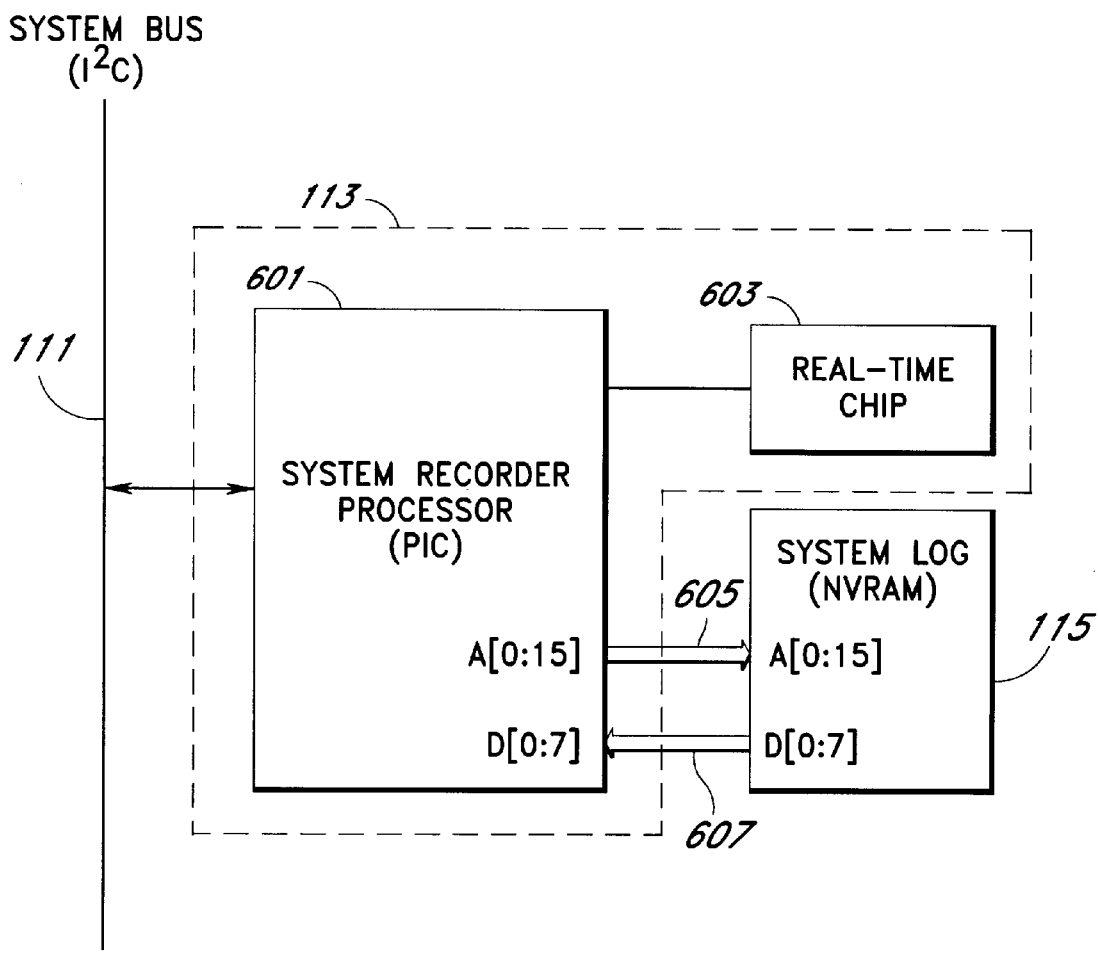
FIG. 6 is a system block diagram of one embodiment of the system recorder of FIG. 1.

Referring to FIG. 6, a block diagram of one embodiment of the system recorder 115 of FIG. 1 is illustrated. The system recorder 115 is enclosed by the dashed lines and includes a system recorder processor 601 and a real-time clock chip 603. In one embodiment, the system recorder processor is a PIC chip, part no. P1C16C65, manufactured by Microchip Technologies, Inc., and the real-time clock chip 603 is a Dallas 1603 IC Chip, manufactured by Dallas Semiconductor, Inc. of Dallas, Tex., and which includes a four-byte counter which is incremented every second. Since there are 32 bits, the real-time clock chip 603 has the capacity of recording the time for more than 100 years without having to be reset. It also has battery backup power, so if the power goes off, it continues to "tick." The real-time clock chip 603 records "absolute" time. In other words, it does not record time in terms of the time of day in a particular time zone, nor does it reset when the time in the real world is reset forward or back one hour for daylight savings. The operating system must get a reference point for its time by reading the real-time clock chip 603 and then synchronizing it with real world time.

The system recorder processor 601 is coupled to the system bus 117. When a failure condition is detected by the controller 109 (FIG. 1), the controller 109 transmits failure information related to the detected failure condition to the system recorder processor 601. This failure information may include the values of out-of-tolerance operational parameters such as fan speed or a system temperature, for example. Upon receiving this failure information, the system recorder processor 601 queries the real-time clock chip 603 for a time value which is stored in the 8-byte field within the chip 603. The real-time clock chip 603 transmits the value of this 8-byte field to the processor 601 whereupon the processor 601 "stamps" the failure information with this time value. The time value is included as part of the failure information which is subsequently stored in the system log 117.

In order to store data into the system log 117, the system recorder processor 601 must obtain the address of the next available memory space within the system log 117 and set a pointer to that address. The system recorder processor 601 is coupled to the system log 117 by means of an address bus 606 and a data bus 607. Prior to storing or retrieving data from the system log, the processor 601 communicates with the system log 117 in order to ascertain the addresses of relevant memory locations in or from which data is to be either stored or retrieved. Upon receiving an address, the processor 601 can proceed to store or retrieve data from the corresponding memory space, via the data bus 607. FIGS. 7A–7D illustrate a flowchart of one embodiment of a process of reading data from and writing data to the system log.

Figure 7A:
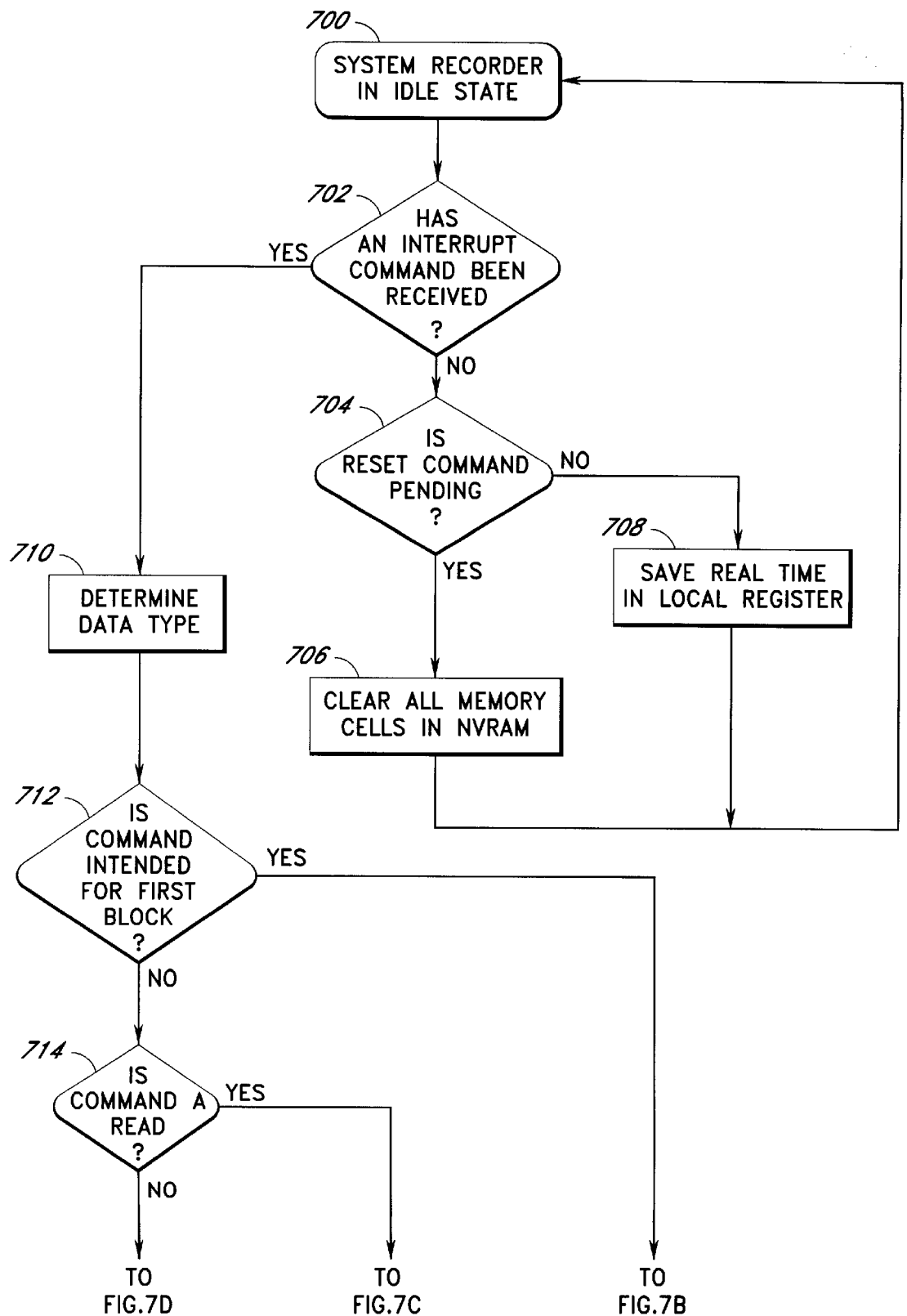
FIGS. 7A–7D together form a flowchart diagram of one embodiment of a process of storing information in the system log and retrieving information from the system log.

Referring now to FIGS. 7A–7D, a flow chart illustrates one embodiment of a method by which the system recorder 115 (FIG. 1) stores and retrieves information from the system log 117. In the embodiment discussed below the system log 117 is a non-volatile random access memory (NVRAM) and is referred to as NVRAM 117. In FIG. 7A, at step 700, the system recorder 115 is typically in an idle state, i.e., waiting for commands from other microcontrollers in the network. At step 702, the system recorder 115 determines if an interrupt command is detected from other microcontrollers. If no interrupt command is detected, then at step 704, the system recorder 115 checks if a reset command is pending. A reset command is a request to clear the all memory cells in the NVRAM 117. If a reset command is detected, then at step 706, the system recorder 115 clears all memory cells in the NVRAM 115 and returns to its idle state at step 700, and the entire process repeats itself. If a reset command is not detected, then at step 708, the system recorder 115 updates the time stored in the real-time clock chip 603 (FIG. 6) every one second. At this step, the system recorder 115 reads the real time clock and saves the real time in a local register (not shown).

If, at step 702, an interrupt command is detected from other microcontrollers, the system recorder 115 determines the type of data in the interrupt command at step 710. For the purpose of logging message events in the NVRAM 117, the log data and event data type are pertinent. As noted above, the log data type is used to write a byte string to a circular log buffer, such as the NVRAM 117. The log data type records system events in the NVRAM 117. The maximum number of bytes that can be written in a log entry is 249 bytes. The system recorder 115 adds a total of six bytes at the beginning of the interrupt command: a two-byte identification code (ID), and a four-byte timestamp for recording the real time of the occurrence of the system event.

With special firmware, the NVRAM 117 is divided into two blocks: a first block having 64 kbytes of memory space, and a second block having 64 kbytes of memory space. The first block of the NVRAM 117 is a fixed-variable memory block which stores ID codes of the devices installed in the network as well as other information. The second block is a memory block which stores message codes in connection with events occurring in the network. The NVRAM 117 may be based upon devices manufactured by Dallas Semiconductor Corporation, e.g., the DS1245Y/AB 1024K Nonvolatile SRAM.

Figure 7B:
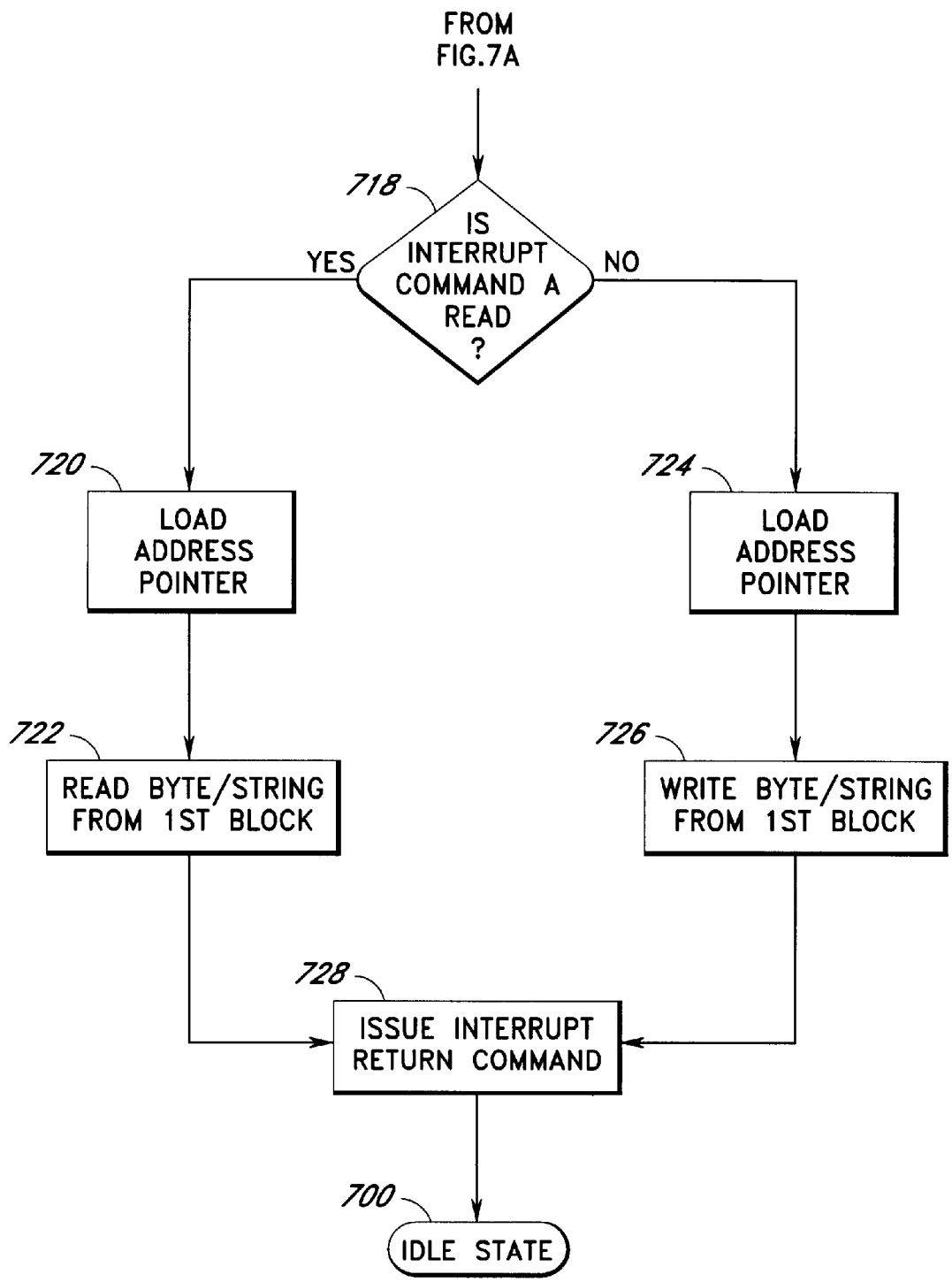
Figure 7C:
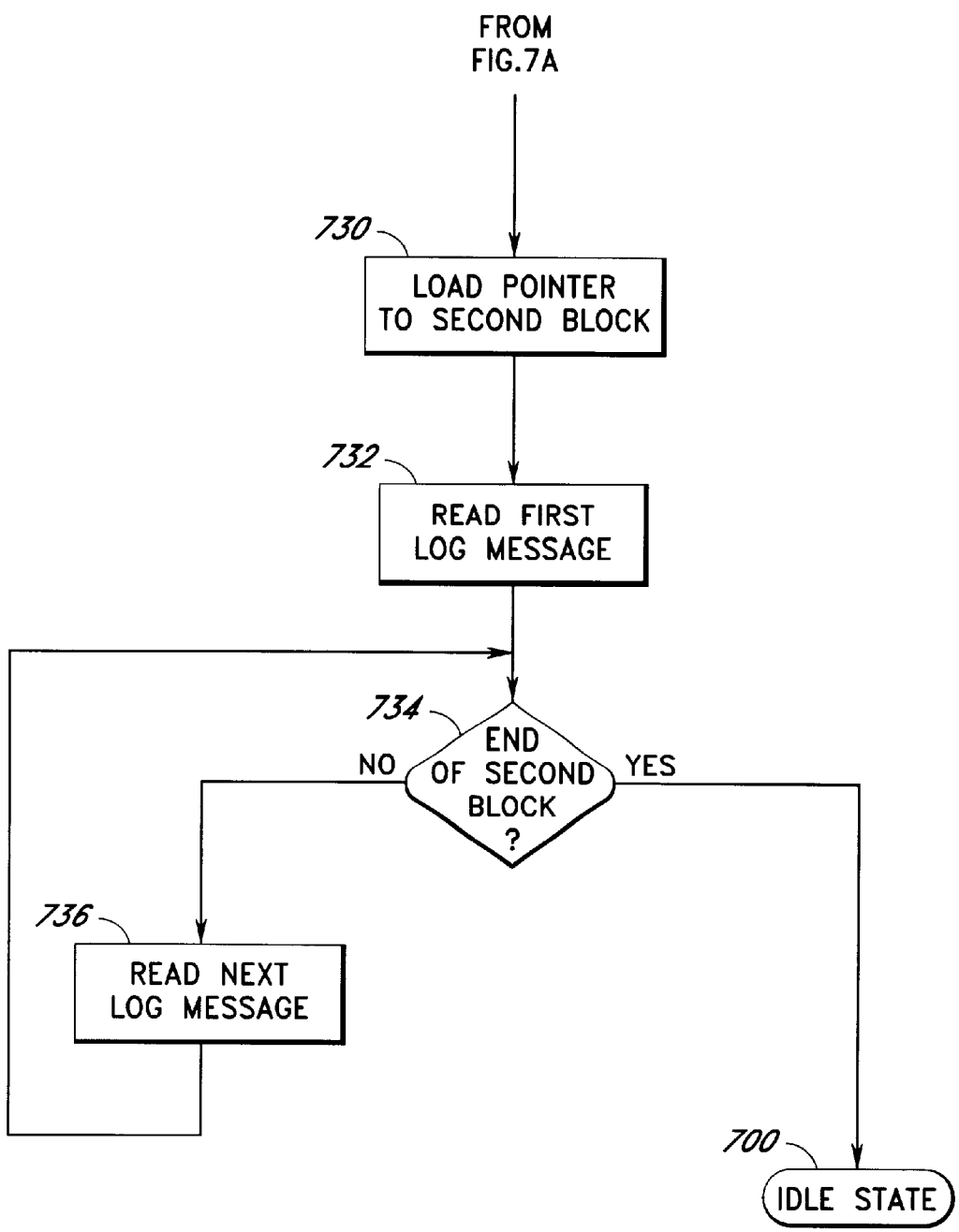
Figure 7D:
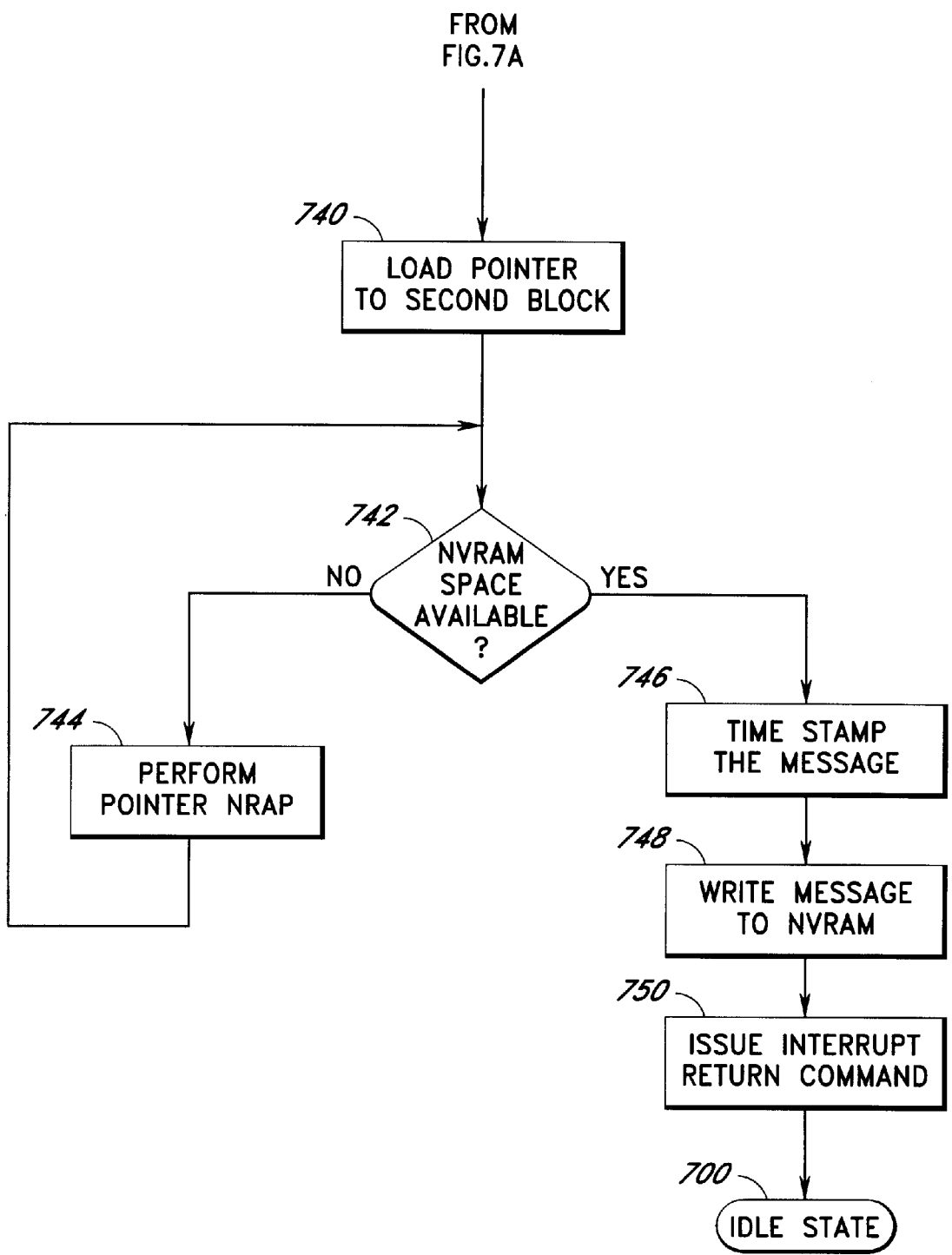

Based on the interpretation of the data type at step 712, the system recorder 115 determines whether the interrupt command is intended to be sent to the first block or second block of the NVRAM 117. If the interrupt command is intended to be sent to the first block of NVRAM 117, then the process described in FIG. 7B is followed. If the interrupt command is not intended to be sent to the first block of NVRAM 117, then it is intended to be sent to the second block of NVRAM 117. At step 714, the system recorder 115 determines whether the interrupt command is a read or write command for the second block. If the interrupt command is a read command, then the process described in FIG. 7C is followed. If the interrupt command is not a read command, then it is a write command and the process described in FIG. 7D is followed.

Referring to FIG. 7B, a flow chart is provided for describing the steps of performing a read from and/or write to the first block of the NVRAM 117. As noted above, the first block of the NVRAM 117 is a 64-kbyte memory block. The first block is a fixed-variable memory block which stores ID codes of the devices installed in the network. Hence, a command addressed to the first block is typically generated by a controller (e.g., chassis controller 112 of FIG. 1) responsible for updating the presence or absence of devices in the network. The process described in FIG. 7B is followed when, at step 712 (shown in FIG. 7A), the system recorder 115 determines that the command interrupt is intended to be sent to the first block of the NVRAM 117.

As shown in FIG. 7B, at step 718, the system recorder 115 determines whether the interrupt command is to read from or write to the NVRAM 117. If the command interrupt is a read command, then at step 720, the system recorder 115 loads the address pointer at the intended address location in NVRAM 117. At step 722, the system recorder 115 reads the intended message from the address location in the NVRAM 117, and forwards the read data to the master device (i.e., device requesting the read operation) in the network. After the read operation is complete, at step 728, the system recorder 115 issues an interrupt return command to return to its idle state at step 700 (shown in FIG. 7A).

If at step 718 the system recorder 115 determines that the interrupt command is a write command, then at step 724, the system recorder 115 loads the address pointer at the intended address location in NVRAM 117. The system recorder 115 preferably checks on the availability of memory space in NVRAM 117 prior to executing a write operation (see FIG. 7D for details). At step 726, the system recorder 115 writes the event message to the address location in the NVRAM 117, and forwards a confirmation to the master device in the network. After the write operation is complete, at step 728, the system recorder 115 issues an interrupt return command to return to its idle state at step 700 (shown in FIG. 7A).

Referring now to FIG. 7C, a flow chart is provided for describing the steps of performing a read operation from the second block of the NVRAM 117. As noted above, the second block of the NVRAM 117 is a 64-kbyte memory block. The second block is a memory block which stores event messages in connection with events occurring in the network. Hence, a command addressed to the second block is typically generated by a controller responsible for updating the occurrence of such events. The process described in FIG. 7C is followed when, at step 714 (shown in FIG. 7A), the system recorder 115 determines that the interrupt command is a read command intended to the second block of the NVRAM 117.

As shown in FIG. 7C, if the system recorder 115 determines that the interrupt command is a read operation, then at step 730, the system recorder 115 loads an address pointer to the intended address in the second block of NVRAM 117. At step 732, the system recorder 115 performs a read operation of the first logged message from the NVRAM 117 commencing with the intended address location. For a read operation, it is preferable that only the 65534 (FFFEh) and 65533 (FFFDh) addresses be recognized. The address 65534 specifies the address of the oldest valid message. The address 65533 specifies the address of the next message following the last message read from the log in NVRAM 117. The last address in the second block of the NVRAM 117 is 65279 (FEFFh). This is also the address at which the system recorder 115 performs a pointer wrap operation (see FIG. 7D for details). In doing so, the system recorder 115 redirects the address pointer to the beginning of the second block of the NVRAM 117. Hence, the address of the next message address after the 65279 address is 0. To perform a read operation of the entire second block in a chronological order, the timestamp is read first. Then, the message logged at address 65534 is read second. This message constitutes the first logged message. Then, the message logged at address 65533 is read next. This message is the next logged message. Then, the message logged at address 65533 is read again to read all subsequently logged messages. The reading at address 65533 terminates until the status field returns a non-zero value such as 07H, for example.

At step 734, the system recorder 115 determines whether the address location has reached the end of the second block in the NVRAM 117. If the address location has not reached the end of the second block, then at step 736, the system recorder 115 performs a read operation of the next logged message using the addressing scheme described above. The system recorder 115 transmits all read messages to the master device via the I$^2$C bus. If the address location has reached the end of the second block, then the system recorder 115 returns to its idle state 700 (shown in FIG. 7C).

Referring now to FIG. 7D, a flow chart is provided for describing the steps of performing a write operation to the second block of the NVRAM 117. Typically, a command addressed to the second block is generated by a controller (e.g., chassis controller 222) responsible for updating the occurrence of such events. The process described in FIG. 7D is followed when, at step 714 (shown in FIG. 7A), the system recorder 115 determines that the interrupt command is a write command directed to the second block of the NVRAM 117.

As shown in FIG. 7D, if the system recorder 115 determines that the interrupt command is a write command, then at step 740, the system recorder 115 loads an address pointer to the intended address in the second block of NVRAM 117. At step 742, the system recorder 115 determines whether a memory space is available in the second block of NVRAM 117 to perform the requested write operation. If a memory space is not available in the second block, then at step 744, the system recorder 115 performs a pointer wrap operation. In doing so, the system recorder 115 redirects the address pointer to the beginning of the second block of the NVRAM 117. The system recorder 115 erases the memory space corresponding to a single previously logged message which occupies that memory space. Additional previously logged messages are erased only if more memory space is required to perform the present write operation.

If the system recorder 115 determines that a memory space is available in the second block of the NVRAM 117, then at step 746, the system recorder 115 fetches the time from the real-time clock 603 and stamps (i.e., appends) the real time to the message being written. As noted above, the real time comprises a four-byte field (i.e., 32 bits) which are appended to the message being written. At step 748, the system recorder 115 writes the time-stamped message to the second block of the NVRAM 117. At step 750, the system recorder 115 issues an interrupt return command to return to its idle state 700 (shown in FIG. 7A).

A further description of the system recorder 115 and the NVRAM 117 can be found in a copending and commonly owned U.S. patent application entitled, "Black Box Recorder For Information System Events," which is listed in Appendix A attached hereto.

FIGS. 8A–8D illustrate a flowchart of one embodiment of the process of reporting system failures in accordance with the invention. As the process is described below reference is also made to FIG. 1 which illustrates a block diagram of one embodiment of the server system 100 which carries out the process shown in FIGS. 8A–8D.

Figure 8A:
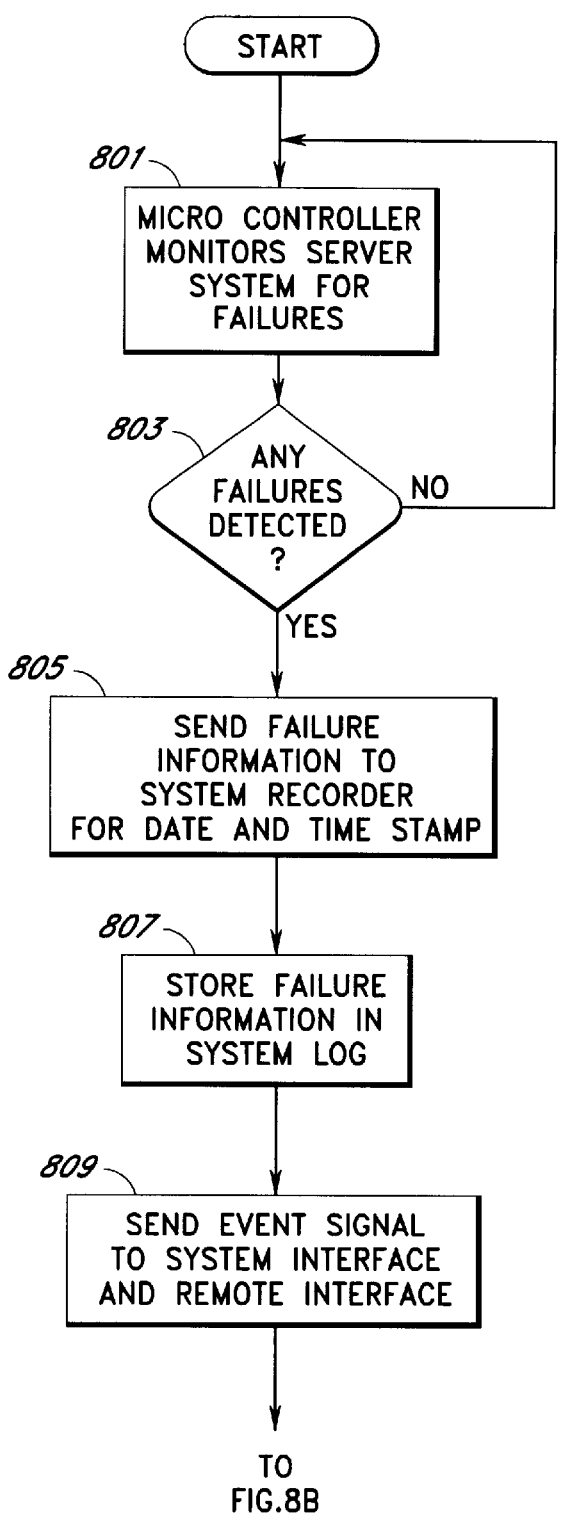
FIG. 8A–8D together form a flowchart illustrating one embodiment of a process for detecting and reporting system failures in accordance with the invention.

Referring to FIG. 8A, the process starts at location 800 and proceeds to step 801 wherein a controller 109 monitors the server 100 for system failures. In step 803, a determination is made as to whether any system failures have been detected. If in step 803, no failures have been detected, the process moves back to step 801 and the controller 109 continues to monitor for system failures. If in step 803 a failure is detected, the process moves to step 805 in which the failure information is sent to the system recorder 115. In this step, the controller 109 sends failure information, such as the value of measured operation parameters which have been determined to be out of tolerance, to the system recorder 115 which assigns a time stamp to the failure event. Next, in step 807, the system recorder 115 logs the failure by storing the failure information, along with its time stamp, in the system log 117. In step 809, an event signal is sent to the system interface 105 and to the remote interface 119. The process then moves to step 811 as shown in FIG. 8B.

Figure 8B:
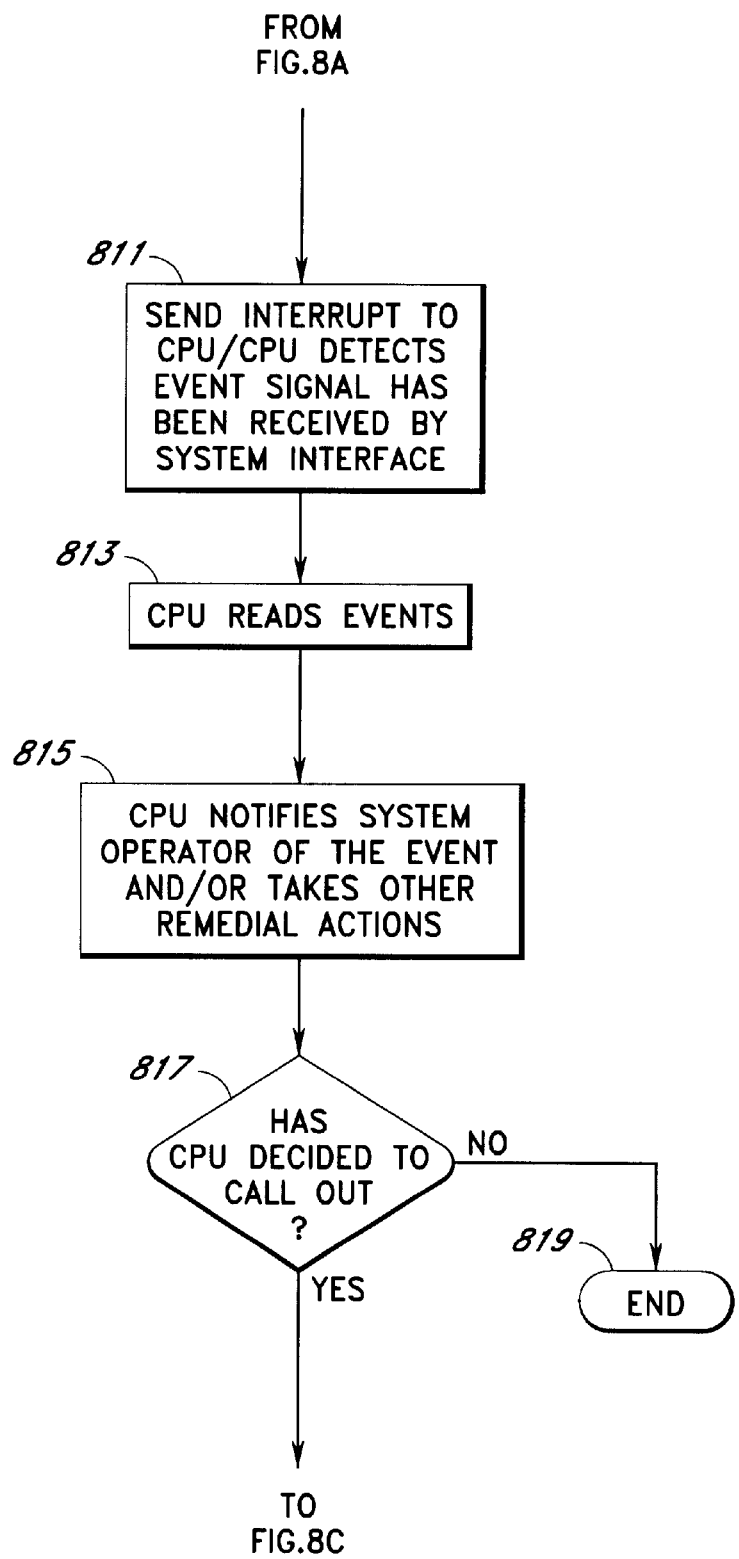

Referring to FIG. 8B, in step 811, an interrupt signal is sent to the CPU 101 of the server system. Or, alternatively, the CPU 101 may be periodically monitoring the system interface 105 in which case the CPU 101 will detect that an event signal has been received by the system interface 105. In step 813, the CPU 101 reads the event from the system interface 105. Thereafter, in step 815, the CPU 101 notifies a system operator or administrator of the event who may then take appropriate measures to correct the failure condition. In one embodiment, the CPU 101 may notify a system operator by displaying an error or event message on a monitor coupled to the CPU 101, or the CPU 101 may simply illuminate a light emitting diode (LED) which indicates that a system failure has been detected. At this point, the system operator may decide to ignore the event message or obtain more information about the event by accessing the system log 117 for the failure information which was stored in it in step 807. By means of operating system software executed by the CPU 101 and the communications protocol established by the system interface 105, the system operator can access this failure information from the system log 117. Additionally, the CPU 101 may take remedial actions on its own initiative (programming). For example, if a critical system failure has been detected, e.g., a system temperature is above a critical threshold, the CPU 101 may back-up all currently running files (core dump into back-up memory space) and then shut down the server system.

In step 817, the CPU 101 decides whether to call out to a local or remote computer in order to notify it of the event. Particular types of events may warrant a call-out to either a local or remote computer in order to notify important personnel or administrators of a particular problem, while other types of events may not. If in step 817 it is determined that the particular event does not warrant a call-out to a local or remote computer, the process ends at step 819. On the other hand, if the CPU 101 decides that a call-out is warranted, the process moves to step 821 as shown in FIG. 8C.

Figure 8C:
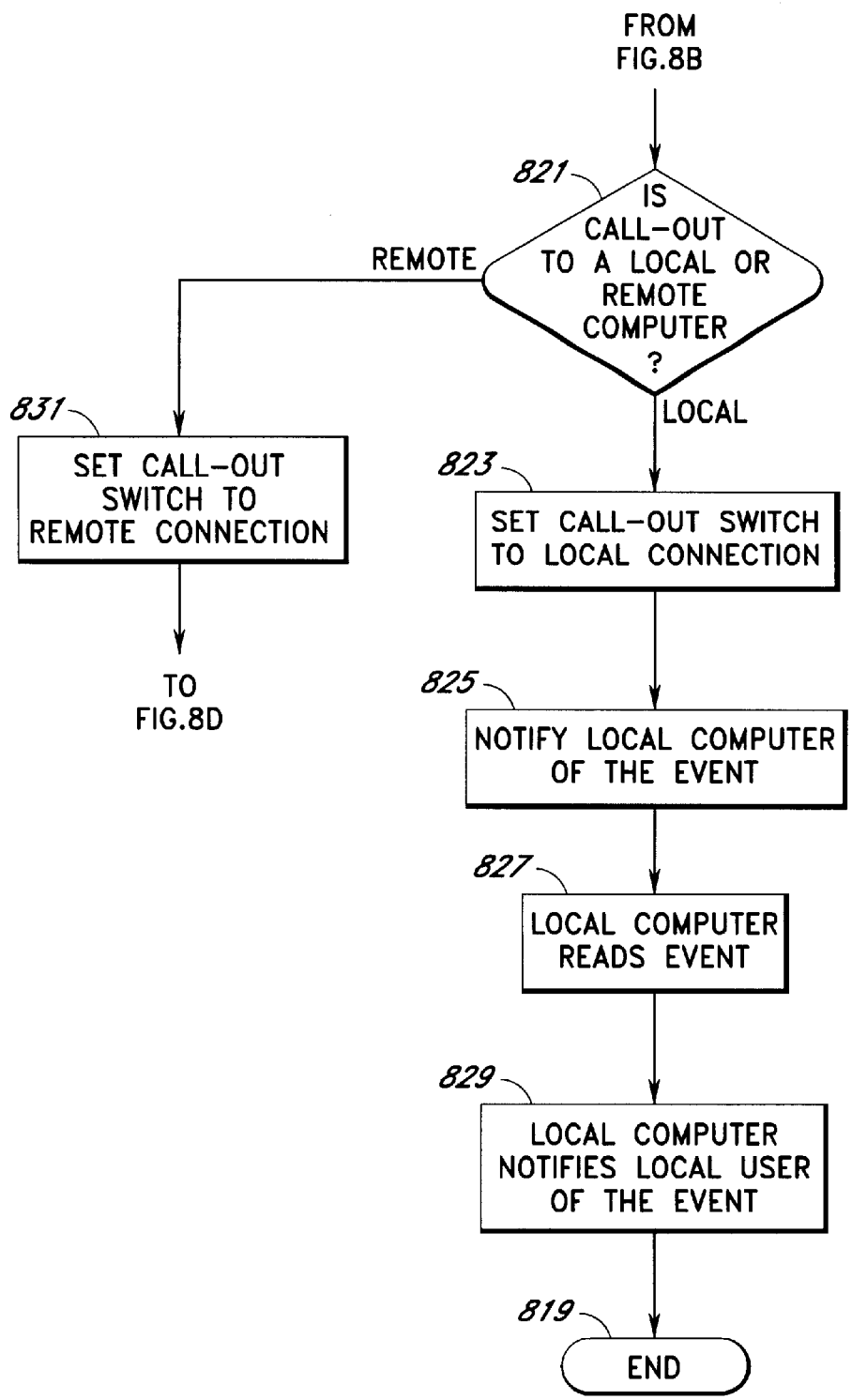

Referring to FIG. 8C, in step 821, the CPU 101 will determine whether the call-out is to be made to a local computer 123, connected to the server system 100 via a local communication line 127 such as a an RS232 line, or to a remote computer 125, connected to the server system 100 via a modem-to-modem connection. If in step 821 it is determined that a call-out to a local computer 123 is to be made, the function of step 823 is implemented wherein the operating system sets the call-out switch 121 to the local connection mode. In step 825, the remote interface 119 notifies the local computer 123 that an event signal has been received. Thereafter, in step 827, the local computer reads the event message from the remote interface 119. Upon reading the event message, in step 829, the local computer 123 may notify a local user of the event condition and/or take other appropriate measures. Depending on the software program running on the operating system of the local computer, the local computer 123 may notify the local user by displaying an error or event message on a monitor of the local computer 123, or the local computer 123 may simply illuminate a light emitting diode (LED) which indicates that a system failure has been detected. At this point, the local user may decide to ignore the event message or obtain more information about the event by accessing the system log for the failure information which was stored in it in step 807. The local user may then contact appropriate personnel located at the site where the server is located and inform and/or instruct such personnel to remedy the problem. Or, the local user may travel to the site himself, or herself, in order to fix the problem. The process then ends at step 819.

Figure 8D:
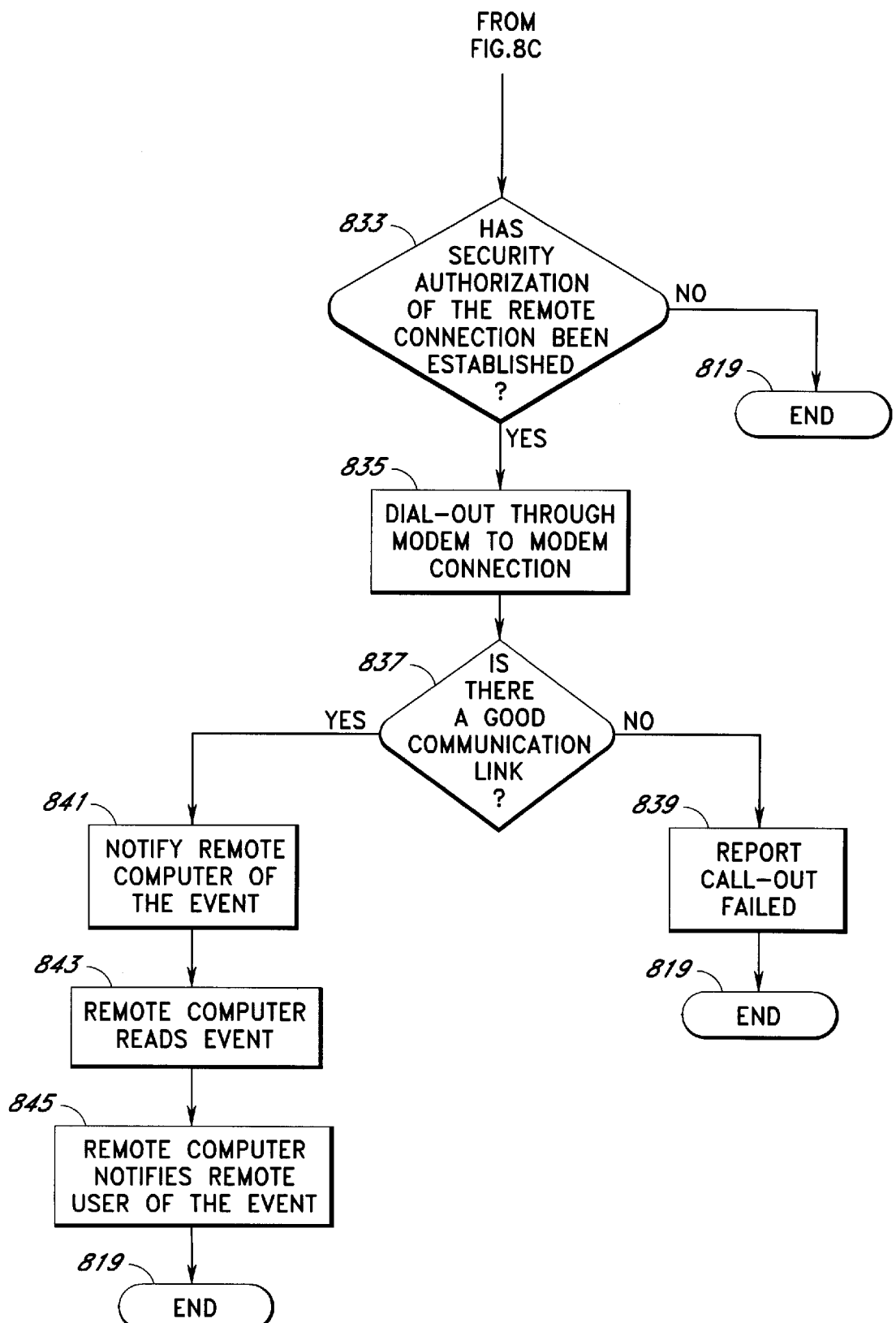

If in step 821 it is determined that a call-out is to be made to a remote computer, the process proceeds to step 831 wherein the call-out switch 121 is set to a remote connection mode. The process then moves to step 833 as shown in FIG. 8D. In step 833, the CPU 101 of the server system determines whether the remote computer 125 has security authorization to receive the event information and access the system log. This function may be accomplished by receiving a password from the remote computer or receiving an encrypted identification signal from the remote computer and verifying that it matches the server's password or identification signal. However, other methods of providing secure transmissions between a host system and a remote system which are known in the art may be utilized in accordance with the invention. If in step 833, security authorization has not been established the process ends at step 819. However, if in step 833, security authorization is established, the process proceeds to step 835, wherein the remote interface 119 dials out through the modem-to-modem connection to establish a communication link with the remote computer 125. The dial out number is automatically provided to the remote interface 119 by the CPU 101 and in one embodiment a list of dial-out numbers may be stored in the system log 117.

In step 837, the remote interface 119 checks whether a good communication link has been established by determining whether a data set read (DSR) and data carrier detect (DCD) signals have been communicated between a server modem 131 and a remote modem 129. The DSR and DCB signals are common signals used in modem-to-modem handshake protocols. However, any protocol for verifying an active modem-to-modem communication link which is known in the art may be utilized in accordance with the invention. If in step 837, it is determined that a good communication link cannot be established, the process proceeds to step 839 wherein the CPU 101 reports that the call-out failed. The process then ends in step 819.

If in step 837, it is determined that a good communication link has been established, the remote interface 119, in step 841, notifies the remote computer 125 that an event signal has been received. In step 843, the remote computer reads the event from the remote interface 119 by reading a bit vector within the remote interface 119. In step 845, after reading the event in step 843, the remote computer 125 notifies a remote user of the event condition and/or take other appropriate measures. Depending on the software program running on the operating system of the remote computer 125, the remote computer 125 may notify a remote user by displaying an error or event message on a monitor of the remote computer 125, or the remote computer 125 may simply illuminate a light emitting diode (LED) which indicates that a system failure has been detected. At this point, the remote user may decide to ignore the event message or obtain more information about the event by accessing the system log for the failure information which was stored in it in step 807. The process then ends at step 819.

As described above, the invention provides a fast and efficient method of detecting system failures and/or events and reporting such failures and events to a client, system operator, or control center of a server system. By logging failure information into a system log, a system operator or client can ascertain the nature of a particular problem and thereafter make an informed decision as to what steps may be required to correct the system error or failure. By providing this type of failure reporting system, the invention alleviates much confusion and frustration on the part of system users which would otherwise result. Additionally, by quickly reporting such failures, the amount of downtime of the server system is reduced.

The invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

Appendix A
Incorporation by Reference of Commonly Owned Applications
The following patent applications, commonly owned and filed October 1, 1997, are hereby incorporated herein in their entirety by reference thereto:

| Title | application No. | Attorney Docket No. |
|---|---|---|
| "System Architecture for Remote Access and Control of Environmental Management" | 08/942,160 | MNFRAME.002A1 |
| "Method of Remote Access and Control of Environmental Management" | 08/942,215 | MNFRAME.002A2 |
| "System for Independent Powering of Diagnostic Processes on a Computer System" | 08/942,410 | MNFRAME.002A3 |
| "Method of Independent Powering of Diagnostic Processes on a Computer System" | 08/942,320 | MNFRAME.002A4 |
| "Diagnostic and Managing Distributed Processor System" | 08/942,402 | MNFRAME.005A1 |
| "Method for Managing a Distributed Processor System" | 08/942,448 | MNFRAME.005A2 |
| "System for Mapping Environmental Resources to Memory for Program Access" | 08/942,222 | MNFRAME.005A3 |
| "Method for Mapping Environmental Resources to Memory for Program Access" | 08/942,214 | MNFRAME.005A4 |
| "Hot Add of Devices Software Architecture" | 08/942,309 | MNFRAME.006A1 |
| "Method for The Hot Add of Devices" | 08/942,306 | MNFRAME.006A2 |
| "Hot Swap of Devices Software Architecture" | 08/942,311 | MNFRAME.006A3 |
| "Method for The Hot Swap of Devices" | 08/942,457 | MNFRAME.006A4 |
| "Method for the Hot Add of a Network Adapter on a System Including a Dynamically Loaded Adapter Driver" | 08/943,072 | MNFRAME.006A5 |

-continued

Appendix A
Incorporation by Reference of Commonly Owned Applications
The following patent applications, commonly owned and filed October 1, 1997, are hereby incorporated herein in their entirety by reference thereto:

| Title | application No. | Attorney Docket No. |
|---|---|---|
| "Method for the Hot Add of a Mass Storage Adapter on a System Including a Statically Loaded Adapter Driver" | 08/942,069 | MNFRAME.006A6 |
| "Method for the Hot Add of a Network Adapter on a System Including a Statically Loaded Adapter Driver" | 08/942,465 | MNFRAME.006A7 |
| "Method for the Hot Add of a Mass Storage Adapter on a System Including a Dynamically Loaded Adapter Driver" | 08/962,963 | MNFRAME.006A8 |
| "Method for the Hot Swap of a Network Adapter on a System Including a Dynamically Loaded Adapter Driver" | 08/943,078 | MNFRAME.006A9 |
| "Method for the Hot Swap of a Mass Storage Adapter on a System Including a Statically Loaded Adapter Driver" | 08/942,336 | MNFRAME.006A10 |
| "Method for the Hot Swap of a Network Adapter on a System Including a Statically Loaded Adapter Driver" | 08/942,459 | MNFRAME.006A11 |
| "Method for the Hot Swap of a Mass Storage Adapter on a System Including a Dynamically Loaded Adapter Driver" | 08/942,458 | MNFRAME.006A12 |
| "Method of Performing an Extensive Diagnostic Test in Conjunction with a BIOS Test Routine" | 08/942,463 | MNFRAME.008A |
| "Apparatus for Performing an Extensive Diagnostic Test in Conjunction with a BIOS Test Routine" | 08/942,163 | MNFRAME.009A |
| "Configuration Management Method for Hot Adding and Hot Replacing Devices" | 08/941,268 | MNFRAME.010A |
| "Configuration Management System for Hot Adding and Hot Replacing Devices" | 08/942,408 | MNFRAME.011A |
| "Apparatus for Interfacing Buses" | 08/942,382 | MNFRAME.012A |
| "Method for Interfacing Buses" | 08/942,413 | MNFRAME.013A |
| "Computer Fan Speed Control Device" | 08/942,447 | MNFRAME.016A |
| "Computer Fan Speed Control Method" | 08/942,216 | MNFRAME.017A |
| "System for Powering Up and Powering Down a Server" | 08/943,076 | MNFRAME.018A |
| "Method of Powering Up and Powering Down a Server" | 08/943,077 | MNFRAME.019A |
| "System for Resetting a Server" | 08/942,333 | MNFRAME.020A |
| "Method of Resetting a Server" | 08/942,405 | MNFRAME.021A |
| "System for Displaying Flight Recorder" | 08/942,070 | MNFRAME.022A |
| "Method of Displaying Flight Recorder" | 08/942,068 | MNFRAME.023A |
| "Synchronous Communication Interface" | 08/943,355 | MNFRAME.024A |
| "Synchronous Communication Emulation" | 08/942,004 | MNFRAME.025A |
| "Software System Facilitating the Replacement or Insertion of Devices in a Computer System" | 08/942,317 | MNFRAME.026A |

-continued

Appendix A
Incorporation by Reference of Commonly Owned Applications
The following patent applications, commonly owned and filed October 1, 1997, are hereby incorporated herein in their entirety by reference thereto:

| Title | application No. | Attorney Docket No. |
|---|---|---|
| "Method for Facilitating the Replacement or Insertion of Devices in a Computer System" | 08/942,316 | MNFRAME.027A |
| "System Management Graphical User Interface" | 08/943,357 | MNFRAME.028A |
| "Display of System Information" | 08/942,195 | MNFRAME.029A |
| "Data Management System Supporting Hot Plug Operations on a Computer" | 08/942,129 | MNFRAME.030A |
| "Data Management Method Supporting Hot Plug Operations on a Computer" | 08/942,124 | MNFRAME.031A |
| "Alert Configurator and Manager" | 08/942,005 | MNFRAME.032A |
| "Managing Computer System Alerts" | 08/943,356 | MNFRAME.033A |
| "Computer Fan Speed Control System" | 08/940,301 | MNFRAME.034A |
| "Computer Fan Speed Control System Method" | 08/941,267 | MNFRAME.035A |
| "Black Box Recorder for Information System Events" | 08/942,381 | MNFRAME.036A |
| "Method of Recording Information System Events" | 08/942,164 | MNFRAME.037A |
| "System for Automatically Reporting a System Failure in a Server" | 08/942,384 | MNFRAME.041A |
| "Expansion of PCI Bus Loading Capacity" | 08/942,404 | MNFRAME.042A |
| "Method for Expanding PCI Bus Loading Capacity" | 08/942,223 | MNFRAME.043A |
| "System for Displaying System Status" | 08/942,347 | MNFRAME.044A |
| "Method of Displaying System Status" | 08/942,071 | MNFRAME.045A |
| "Fault Tolerant Computer System" | 08/942,194 | MNFRAME.046A |
| "Method for Hot Swapping of Network Components" | 08/943,044 | MNFRAME.047A |
| "A Method for Communicating a Software Generated Pulse Waveform Between Two Servers in a Network" | 08/942,221 | MNFRAME.048A |
| "A System for Communicating a Software Generated Pulse Waveform Between Two Servers in a Network" | 08/942,409 | MNFRAME.049A |
| "Method for Clustering Software Applications" | 08/942,318 | MNFRAME.050A |
| "System for Clustering Software Applications" | 08/942,411 | MNFRAME.051A |
| "Method for Automatically Configuring a Server after Hot Add of a Device" | 08/942,319 | MNFRAME.052A |
| "System for Automatically Configuring a Server after Hot Add of a Device" | 08/942,331 | MNFRAME.053A |
| "Method of Automatically Configuring and Formatting a Computer System and Installing Software" | 08/942,412 | MNFRAME.054A |
| "System for Automatically Configuring and Formatting a Computer System and Installing Software" | 08/941,955 | MNFRAME.055A |
| "Determining Slot Numbers in a Computer" | 08/942,462 | MNFRAME.056A |

-continued

Appendix A
Incorporation by Reference of Commonly Owned Applications
The following patent applications, commonly owned and filed
October 1, 1997, are hereby incorporated herein in their entirety by
reference thereto:

| Title | application No. | Attorney Docket No. |
|---|---|---|
| "System for Detecting Errors in a Network" | 08/942,169 | MNFRAME.058A |
| "Method of Detecting Errors in a Network" | 08/940,302 | MNFRAME.059A |
| "System for Detecting Network Errors" | 08/942,407 | MNFRAME.060A |
| "Method of Detecting Network Errors" | 08/942,573 | MNFRAME.061A |

What is claimed is:

1. A method of reporting a system failure in a server system, comprising:
   detecting a system failure condition;
   transmitting failure information related to the failure condition to an independently functional system recorder;
   storing the failure information related to the failure condition in a system log;
   reporting an occurrence of an event; and accessing the system log to read the failure information from the system log.

2. The method of claim 1 wherein
   the act of reporting an occurrence of an event comprises reporting the occurrence of the event to a central processing unit of the server system.

3. The method of claim 2 further comprising notifying an operator of the system failure.

4. The method of claim 3 wherein the act of notifying an operator comprises displaying a message on a monitor coupled to the central processing unit.

5. The method of claim 2 further comprising determining when the failure condition occurred and storing a representation of when the failure condition occurred in the system log.

6. The method of claim 2 wherein the act of reporting the occurrence of the event to the central processing unit comprises:
   sending an event signal to a system interface, coupled to the central processing unit;
   setting a bit in a bit vector within the system interface, wherein the setting of the bit corresponds to a specified type of system failure; and
   sending an interrupt signal to the central processing unit after the bit is set, wherein, upon receiving the interrupt signal the central processing unit reads a status register within the system interface to ascertain that the event signal has been received by the system interface.

7. The method of claim 6 further comprising reading the bit vector to ascertain a type of event.

8. The method of claim 2 wherein the act of reporting the occurrence of the event to the central processing unit comprises:
   sending an event signal to a system interface, coupled to the central processing unit;
   setting a bit in a bit vector within the system interface, wherein the setting of the bit corresponds to a specified type of system failure; and
   setting a status of a status register within the system interface to indicate the occurrence of the event, wherein the central processing unit monitors the status register within the system interface at specified periodic intervals.

9. The method of claim 8 further comprising reading the bit vector to ascertain a type of event.

10. The method of claim 2 further comprising reporting the occurrence of the event to a local computer connected to server system via a remote interface.

11. The method of claim 10 wherein the act of reporting the occurrence of the event to the local computer comprises:
    sending an event signal to the remote interface;
    setting a bit in a bit vector within the remote interface, wherein the setting of the bit corresponds to a specified type of system failure; and
    notifying the local computer that the event signal has been received by the remote interface.

12. The method of claim 11 wherein the act of notifying the local computer comprises transmitting a ready-to-read signal to the local computer, wherein, upon receiving the ready-to-read signal, the local computer interrogates the remote interface to ascertain that the bit in the bit vector has been set.

13. The method of claim 12 further comprising notifying a local operator, who is using the local computer, of the system failure.

14. The method of claim 13 wherein the act of notifying the local operator comprises displaying a message on a monitor coupled to the local computer.

15. The method of claim 13 further comprising accessing the system log through the local computer to read the failure information.

16. The method of claim 2 further comprising reporting the occurrence of the event to a remote computer connected to the server system via a remote interface, wherein the remote computer is connected to the remote interface via a modem-to-modem connection.

17. The method of claim 16 wherein the act of reporting the occurrence of the event to the remote computer comprises:
    sending an event signal to the remote interface;
    setting a bit in a bit vector within the remote interface, wherein the setting of the bit corresponds to a specified type of system failure; and
    notifying the remote computer that the event signal has been received by the remote interface.

18. The method of claim 17 wherein the act of notifying the remote computer comprises:
    automatically calling a phone number corresponding to a modem coupled to the remote computer, wherein, upon receiving the call, the remote computer interrogates the remote interface to ascertain that the bit in the bit vector has been set.

19. The method of claim 18 further comprising:
    verifying that the remote computer is authorized to access the server system via the remote interface; and
    verifying that a communication link has been established between the remote computer and the remote interface.

20. The method of claim 18 further comprising notifying a remote operator, who is using the remote computer, of the system failure.

21. The method of claim 20 wherein the act of notifying the remote operator comprises displaying a message on a monitor coupled to the remote computer.

22. The method of claim 20 further comprising accessing the system log through the remote computer to read the failure information.

23. A method of reporting a system failure in a server system, comprising:

detecting a system failure condition;

transmitting failure information related to the failure condition to an independently functional system recorder;

assigning a time value to the failure information;

storing the failure information and its time value in a system log;

reporting an occurrence of an event to a central processing unit coupled to the server system; accessing the system log to read the failure information from the system log; and communicating failure information from the system log to an operator.

24. The method of claim 23 wherein the act of reporting the occurrence of the event comprises:

sending an event signal to a system interface, coupled to the central processing unit;

setting a bit in a bit vector within the system interface, wherein the setting of the bit corresponds to a specified type of system failure; and sending an interrupt signal to the central processing unit after the bit is set, wherein, upon receiving the interrupt signal the central processing unit reads a status register within the system interface to ascertain that the event signal has been received by the system interface.

25. The method of claim 24 further comprising reading the bit vector.

26. The method of claim 23 wherein the act of reporting the occurrence of the event to the central processing unit comprises:

sending an event signal to a system interface, coupled to the central processing unit;

setting a bit in a bit vector within the system interface, wherein the setting of the bit corresponds to a specified type of system failure; and setting a status of a status register within the system interface to indicate the occurrence of the event, wherein the central processing unit monitors the status register within the system interface at specified periodic intervals.

27. The method of claim 26 further comprising reading the bit vector.

28. The method of claim 23 wherein the specified type of failure is selected from a group consisting of: a central processing unit failure, a power supply failure, a fan failure, a canister failure, and a temperature failure.

29. A method of reporting a system failure in a server system, comprising:

detecting a system failure condition;

transmitting failure information related to the failure condition to an independently functional system recorder;

assigning a time value to the failure information;

storing the failure information and its time value in a system log;

reporting an occurrence of an event to a local computer coupled to the server system via a remote interface; accessing the system log to read the failure information from the system log; and communicating failure information from the system log to an operator.

30. The method of claim 29 wherein the act of reporting the occurrence of the event to the local computer comprises:

sending an event signal to the remote interface;

setting a bit in a bit vector within the remote interface, wherein the setting of the bit corresponds to a specified type of system failure; and notifying the local computer that the event signal has been received by the remote interface.

31. The method of claim 30 wherein the act of notifying the local computer comprises transmitting a ready-to-read signal to the local computer, wherein, upon receiving the ready-to-read signal, the local computer interrogates the remote interface to ascertain that the bit in the bit vector has been set.

32. The method of claim 31 further comprising notifying a local operator, who is using the local computer, of the system failure.

33. The method of claim 32 wherein the act of notifying the local operator comprises displaying a message on a monitor coupled to the local computer.

34. A method of reporting a system failure in a server system, comprising:

detecting a system failure condition;

transmitting failure information related to the failure condition to an independently functional system recorder;

assigning a time value to the failure information;

storing the failure information and its time value in a system log;

reporting an occurrence of an event to a remote computer coupled to the server system via a remote interface, wherein the remote computer is connected to the remote interface via a modem connection; accessing the system log to read the failure information from the system log; and communicating failure information from the system log to an operator.

35. The method of claim 34 wherein the act of reporting the occurrence of the event to the remote computer comprises:

sending an event signal to the remote interface;

setting a bit in a bit vector within the remote interface, wherein the setting of the bit corresponds to a specified type of system failure; and notifying the remote computer that the event signal has been received by the remote interface.

36. The method of claim 35 wherein the act of notifying the remote computer comprises:

automatically calling a phone number corresponding to a modem coupled to the remote computer, wherein, upon receiving the call, the remote computer interrogates the remote interface to ascertain that the bit in the bit vector has been set.

37. The method of claim 36 further comprising:

verifying that the remote computer is authorized to access the server system via the remote interface; and verifying that a communication link has been established between the remote computer and the remote interface.

38. The method of claim 36 further comprising notifying a remote operator, who is using the remote computer, of the system failure.

39. The method of claim 38 wherein the act of notifying the remote operator comprises displaying a message on a monitor coupled to the remote computer.

40. A method of reporting a system failure in a server system, comprising:

detecting a system failure condition;

transmitting failure information related to the failure condition to an independently functional system recorder;

storing the failure information in a system log; and executing a central processing unit operation in response to detecting a system failure condition, wherein the central processing unit operation comprises accessing the system log to read the failure information stored therein.

41. The method of claim 40 wherein the central processing unit operation comprises notifying an operator of the system failure.

42. The method of claim 41 wherein the act of notifying an operator comprises displaying a message on a monitor coupled to the central processing unit.

* * * * *

UNITED STATES PATENT AND TRADEMARK OFFICE
CERTIFICATE OF CORRECTION

PATENT NO.   : 6,243,838 B1
DATED        : June 5, 2001
INVENTOR(S)  : Liu et al.

It is certified that error appears in the above-identified patent and that said Letters Patent is hereby corrected as shown below:

Column 25,
Line 11, please delete the words "reporting an occurrence of an event to a central processing unit coupled to the server system log to read the failure information from the system log; and" and replace therefor -- accessing the system log to read the failure information from the system log; reporting an occurrence of an event to a central processing unit coupled to the server system; and --.

Signed and Sealed this

Nineteenth Day of August, 2003

JAMES E. ROGAN
*Director of the United States Patent and Trademark Office*

(12) EX PARTE REEXAMINATION CERTIFICATE (10394th)
United States Patent
Liu et al.

(10) Number: US 6,243,838 C1
(45) Certificate Issued: Nov. 12, 2014

(54) METHOD FOR AUTOMATICALLY REPORTING A SYSTEM FAILURE IN A SERVER

(75) Inventors: Ji-hwan Liu, Cupertino, CA (US); Ken Nguyen, San Jose, CA (US); Karl Johnson, Palo Alto, CA (US)

(73) Assignee: Round Rock Research, LLC, Mt. Kisco, NY (US)

Reexamination Request:
No. 90/012,329, May 30, 2012

Reexamination Certificate for:
Patent No.: 6,243,838
Issued: Jun. 5, 2001
Appl. No.: 08/942,168
Filed: Oct. 1, 1997

Certificate of Correction issued Aug. 19, 2003

Related U.S. Application Data

(60) Provisional application No. 60/046,397, filed on May 13, 1997, provisional application No. 60/047,016, filed on May 13, 1997, provisional application No. 60/046,416, filed on May 13, 1997.

(51) Int. Cl.
G06F 1/26 (2006.01)
G06F 3/06 (2006.01)
G06F 9/445 (2006.01)
G06F 11/07 (2006.01)
G06F 11/22 (2006.01)
G06F 13/40 (2006.01)
H04L 12/24 (2006.01)
H04L 12/26 (2006.01)
H04L 12/40 (2006.01)
H04L 12/56 (2006.01)

(52) U.S. Cl.
USPC .. 714/57; 714/43; 714/E11.025; 714/E11.024

(58) Field of Classification Search
None
See application file for complete search history.

(56) References Cited

To view the complete listing of prior art documents cited during the proceeding for Reexamination Control Number 90/012,329, please refer to the USPTO's public Patent Application Information Retrieval (PAIR) system under the Display References tab.

*Primary Examiner* — Michael J. Yigdall

(57) ABSTRACT

A method of reporting a system failure in a server system, which includes the following acts: detecting a system failure condition; transmitting failure information related to the failure condition to a system recorder; storing the failure information into a system log; sending an event signal to a system interface; and reporting an occurrence of an event to a central processing unit of the server system.

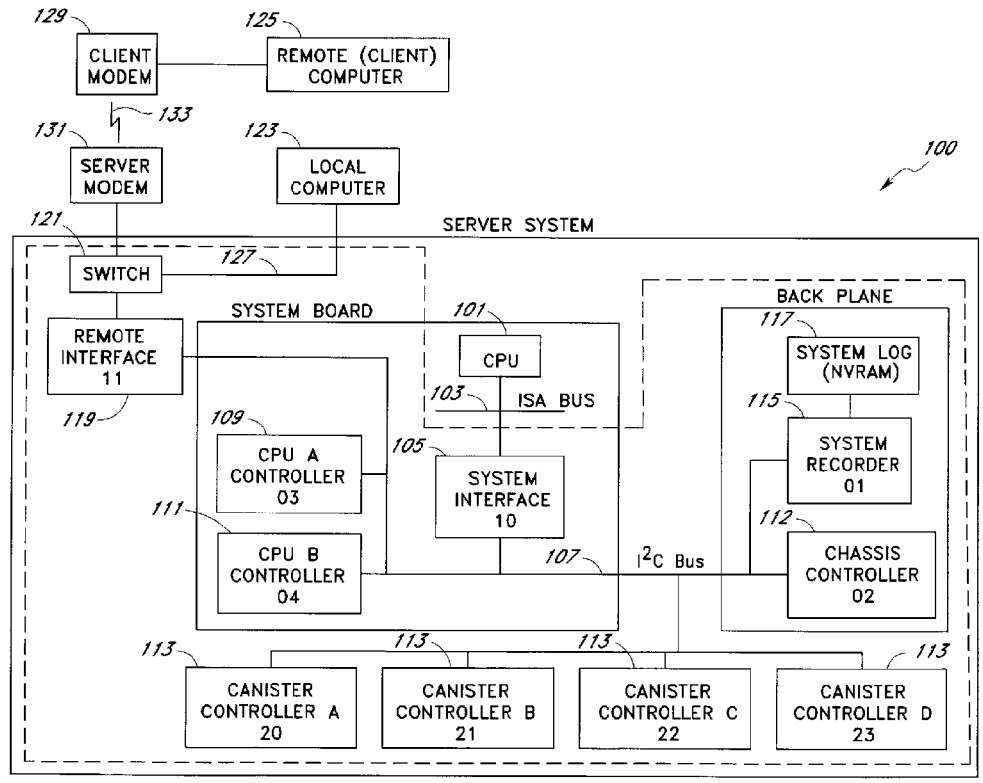

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-5, 10, 16, 23, 28, 29, 34 and 40-42 are cancelled.

Claims 6, 8, 11, 17, 24, 26, 30 and 35 are determined to be patentable as amended.

Claims 7, 9, 12-15, 18-22, 25, 27, 31-33 and 36-39, dependent on an amended claim, are determined to be patentable.

New claims 43-46 are added and determined to be patentable.

6. [The method of claim 2] *A method of reporting a system failure in a server system, comprising:*
*detecting a system failure condition;*
*transmitting failure information related to the failure condition to an independently functional system recorder;*
*storing the failure information related to the failure condition in a system log;*
*reporting an occurrence of an event,* wherein the act of reporting an occurrence of an event comprises reporting the occurrence of the event to a central processing unit of the server system; *and*
*accessing the system log to read the failure information from the system log;*
wherein the act of reporting the occurrence of the event to the central processing unit comprises:
sending an event signal to a system interface, coupled to the central processing unit;
setting a bit in a bit vector within the system interface, wherein the setting of the bit corresponds to a specified type of system failure; and
sending an interrupt signal to the central processing unit after the bit is set, wherein, upon receiving the interrupt signal the central processing unit reads a status register within the system interface to ascertain that the event signal has been received by the system interface.

8. [The method of claim 2] *A method of reporting a system failure in a server system, comprising:*
*detecting a system failure condition;*
*transmitting failure information related to the failure condition to an independently functional system recorder;*
*storing the failure information related to the failure condition in a system log;*
*reporting an occurrence of an event,* wherein the act of reporting an occurrence of an event comprises reporting the occurrence of the event to a central processing unit of the server system; *and*
*accessing the system log to read the failure information from the system log;*
wherein the act of reporting the occurrence of the event to the central processing unit comprises:
sending an event signal to a system interface, coupled to the central processing unit;
setting a bit in a bit vector within the system interface, wherein the setting of the bit corresponds to a specified type of system failure; and
setting a status of a status register within the system interface to indicate the occurrence of the event, wherein the central processing unit monitors the status register within the system interface at specified periodic intervals.

11. [The method of claim 10] *A method of reporting a system failure in a server system, comprising:*
*detecting a system failure condition;*
*transmitting failure information related to the failure condition to an independently functional system recorder;*
*storing the failure information related to the failure condition in a system log;*
*reporting an occurrence of an event; and*
*accessing the system log to read the failure information from the system log;*
*wherein the act of reporting an occurrence of an event comprises reporting the occurrence of the event to a central processing unit of the server system and reporting the occurrence of the event to a local computer connected to server system via a remote interface;*
wherein the act of reporting the occurrence of the event to the local computer comprises:
sending an event signal to the remote interface;
setting a bit in a bit vector within the remote interface, wherein the setting of the bit corresponds to a specified type of system failure; and
notifying the local computer that the event signal has been received by the remote interface.

17. [The method of claim 16] *A method of reporting a system failure in a server system, comprising:*
*detecting a system failure condition;*
*transmitting failure information related to the failure condition to an independently functional system recorder;*
*storing the failure information related to the failure condition in a system log;*
*reporting an occurrence of an event,* wherein the act of reporting an occurrence of an event comprises reporting the occurrence of the event to a central processing unit of the server system;
*accessing the system log to read the failure information from the system log; and*
*reporting the occurrence of the event to a remote computer connected to the server system via a remote interface, wherein the remote computer is connected to the remote interface via a modem-to-modem connection;*
wherein the act of reporting the occurrence of the event to the remote computer comprises:
sending an event signal to the remote interface;
setting a bit in a bit vector within the remote interface, wherein the setting of the bit corresponds to a specified type of system failure; and
notifying the remote computer that the event signal has been received by the remote interface.

24. [The method of claim 23] *A method of reporting a system failure in a server system, comprising:*
*detecting a system failure condition;*
*transmitting failure information related to the failure condition to an independently functional system recorder;*
*assigning a time value to the failure information;*
*storing the failure information and its time value in a system log;*
*accessing the system log to read the failure information from the system log;* reporting an occurrence of an event to a central processing
unit coupled to the server system; and
communicating failure information from the system log to
an operator;
wherein the act of reporting the occurrence of the event
comprises sending an event signal to a system interface,
coupled to the central processing unit;
wherein the act of reporting the occurrence of the event
comprises:
[sending an event signal to a system interface, coupled to
the central processing unit;]
setting a bit in a bit vector within the system interface,
wherein the setting of the bit corresponds to a specified
type of system failure; and
sending an interrupt signal to the central processing unit
after the bit is set, wherein, upon receiving the interrupt
signal the central processing unit reads a status register
within the system interface to ascertain that the event
signal has been received by the system interface.

26. [The method of claim 23] *A method of reporting a
system failure in a server system, comprising:*
*detecting a system failure condition;*
*transmitting failure information related to the failure condition to an independently functional system recorder;*
*assigning a time value to the failure information;*
*storing the failure information and its time value in a system log;*
*accessing the system log to read the failure information from the system log;*
*reporting an occurrence of an event to a central processing unit coupled to the server system; and*
*communicating failure information from the system log to an operator;*
*wherein the act of reporting the occurrence of the event comprises sending an event signal to a system interface, coupled to the central processing unit;*
wherein the act of reporting the occurrence of the event to
the central processing unit comprises:
[sending an event signal to a system interface, coupled to
the central processing unit;]
setting a bit in a bit vector within the system interface,
wherein the setting of the bit corresponds to a specified
type of system failure; and
setting a status of a status register within the system interface to indicate the occurrence of the event, wherein the
central processing unit monitors the status register
within the system interface at specified periodic intervals.

30. [The method of claim 29] *A method of reporting a
system failure in a server system, comprising:*
*detecting a system failure condition;*
*transmitting failure information related to the failure condition to an independently functional system recorder;*
*assigning a time value to the failure information;*
*storing the failure information and its time value in a system log;*
*reporting an occurrence of an event to a local computer coupled to the server system via a remote interface;*
*accessing the system log to read the failure information from the system log; and*
*communicating failure information from the system log to an operator;*
*wherein the act of reporting the occurrence of the event to the local computer comprises sending an event signal to the remote interface;*
wherein the act of reporting the occurrence of the event to
the local computer comprises:
[sending an event signal to the remote interface;]
setting a bit in a bit vector within the remote interface,
wherein the setting of the bit corresponds to a specified
type of system failure; and
notifying the local computer that the event signal has been
received by the remote interface.

35. [The method of claim 34] *A method of reporting a
system failure in a server system, comprising:*
*detecting a system failure condition;*
*transmitting failure information related to the failure condition to an independently functional system recorder;*
*assigning a time value to the failure information;*
*storing the failure information and its time value in a system log;*
*reporting an occurrence of an event to a remote computer coupled to the server system via a remote interface, wherein the remote computer is connected to the remote interface via a modem connection;*
*accessing the system log to read the failure information from the system log; and*
*communicating failure information from the system log to an operator;*
*wherein the act of reporting the occurrence of the event to the remote computer comprises sending an event signal to the remote interface;*
wherein the act of reporting the occurrence of the event to
the remote computer comprises:
[sending an event signal to the remote interface;]
setting a bit in a bit vector within the remote interface,
wherein the setting of the bit corresponds to a specified
type of system failure; and
notifying the remote computer that the event signal has
been received by the remote interface.

43. *A method of reporting a system failure in a server
system, the server system including a server bus that transmits data to and from a central processing unit (CPU) and a
system bus that transfers data to and from a plurality of
monitoring components, the method comprising:*
*detecting a system failure condition from one of the plurality of monitoring components;*
*transmitting failure information related to the failure condition, via the system bus, to an independently functional system recorder;*
*storing the failure information related to the failure condition in a system log;*
*reporting an occurrence of an event via the server bus; and*
*accessing the system log to read the failure information from the system log;*
*wherein the server system further comprises a chassis controller, the method further comprising communicating a failure condition from the chassis controller configured to the independently functional system recorder via the system bus;*
*wherein the failure condition from the chassis controller specifies a processor identification code.*

44. *The method of claim 43, wherein the processor identification code comprises a field that is seven (7) bits wide.*

45. *A method of reporting a system failure in a server
system, comprising:*
*detecting a system failure condition;*
*transmitting failure information related to the failure condition to an independently functional system recorder;*
*assigning an absolute time value to the failure information;*
*storing the failure information and its absolute time value in a system log;*
*reporting an occurrence of an event to a central processing unit coupled to the server system;* accessing the system log to read the failure information from the system log; and communicating failure information from the system log to an operator;

wherein the act of assigning an absolute time value occurs at the independently functional system recorder;

wherein the absolute time value is generated by a four-byte counter which is incremented every second.

46. A method of reporting a system failure in a server system, comprising:

detecting a system failure condition;

transmitting failure information related to the failure condition to an independently functional system recorder;

storing the failure information related to the failure condition in a system log;

reporting an occurrence of an event, the act of reporting an occurrence of an event comprises reporting the occurrence of the event to a central processing unit of the server system; and accessing the system log to read the failure information from the system log; and wherein the act of reporting the occurrence of the event to the central processing unit comprises sending an event signal to a system interface, coupled to the central processing unit;

assigning an absolute time value to the failure information prior to storing the failure information in the system log;

wherein the absolute time value is generated by a four-byte counter which is incremented every second.

* * * * *